US010382269B2

United States Patent
Haapanen et al.

(10) Patent No.: US 10,382,269 B2
(45) Date of Patent: Aug. 13, 2019

(54) CONFIGURING DEVICES USING DEVICE MANAGEMENT TEMPLATES

(71) Applicants: Tom Haapanen, Kitchener (CA); Tom Mulholland, Newburgh, NY (US)

(72) Inventors: Tom Haapanen, Kitchener (CA); Tom Mulholland, Newburgh, NY (US)

(73) Assignee: RICOH COMPANY, LTD., Tokyo (JP)

(*) Notice: Subject to any disclaimer, the term of this patent is extended or adjusted under 35 U.S.C. 154(b) by 373 days.

(21) Appl. No.: 15/166,193

(22) Filed: May 26, 2016

(65) Prior Publication Data

US 2017/0346692 A1    Nov. 30, 2017

(51) Int. Cl.
 G06F 15/16 (2006.01)
 H04L 12/24 (2006.01)
 H04L 29/06 (2006.01)

(52) U.S. Cl.
 CPC ...... *H04L 41/0843* (2013.01); *H04L 41/0883* (2013.01); *H04L 41/22* (2013.01); *H04L 63/08* (2013.01)

(58) Field of Classification Search
 CPC . H04L 41/0843; H04L 41/0883; H04L 41/20; H04L 41/22; H04L 63/08
 USPC ............................................. 709/220, 219
 See application file for complete search history.

(56) References Cited

U.S. PATENT DOCUMENTS

| | | | |
|---|---|---|---|
| 7,865,444 B1* | 1/2011 | Biswas | G06F 21/105 705/51 |
| 8,891,106 B1 | 11/2014 | Haapanen | |
| 9,122,433 B2 | 9/2015 | Haapanen | |
| 9,130,838 B2 | 9/2015 | Anderson et al. | |
| 2009/0287913 A1* | 11/2009 | Woods | H04L 41/0806 713/1 |
| 2010/0165877 A1* | 7/2010 | Shukla | H04L 41/0843 370/254 |
| 2012/0054599 A1* | 3/2012 | Nixon | G05B 19/4183 715/236 |
| 2012/0216108 A1* | 8/2012 | Yambal | G06Q 10/10 715/234 |
| 2012/0221503 A1* | 8/2012 | Williamson | G06F 17/17 706/47 |
| 2012/0265865 A1 | 10/2012 | Tanaka et al. | |
| 2012/0266073 A1 | 10/2012 | Tanaka et al. | |
| 2013/0109425 A1* | 5/2013 | Kerger | H04L 65/4061 455/518 |
| 2014/0040011 A1* | 2/2014 | Kim | G06Q 30/02 705/14.43 |

(Continued)

OTHER PUBLICATIONS

U.S. Appl. No. 13/086,608, Shun Tanaka Tom Haapanen Jim Vopni, Device Management System, Pending (US 2012/0265865 A1).

(Continued)

*Primary Examiner* — Jeffrey R Swearingen
*Assistant Examiner* — Oluwatosin M Gidado
(74) *Attorney, Agent, or Firm* — Duft & Bornsen, PC

(57) ABSTRACT

Tools are provided to enable a service technician or administrator to apply settings, via a mobile terminal, from configuration templates to a device, particularly when the device is accessible through a network. Such configuration templates may be obtained or downloaded to the mobile terminal from a device management server on a regular basis or as needed or on demand.

18 Claims, 37 Drawing Sheets

(56) References Cited

U.S. PATENT DOCUMENTS

| | | | | |
|---|---|---|---|---|
| 2014/0156816 | A1* | 6/2014 | Lopez Da Silva | H04L 41/042 709/221 |
| 2014/0222980 | A1 | 8/2014 | Hagiwara et al. | |
| 2014/0223325 | A1 | 8/2014 | Melendez et al. | |
| 2014/0335485 | A1* | 11/2014 | Dasgupta | G09B 19/00 434/219 |
| 2015/0117292 | A1* | 4/2015 | Cho | H04W 76/14 455/426.1 |
| 2015/0365279 | A1* | 12/2015 | Kuo | H04L 67/104 709/219 |
| 2016/0082988 | A1* | 3/2016 | Kurz | B61L 15/0072 701/19 |
| 2016/0127378 | A1* | 5/2016 | Gupta | H04L 63/101 726/4 |
| 2016/0357422 | A1* | 12/2016 | Milden | G06F 3/04847 |
| 2017/0346694 | A1* | 11/2017 | Buendgen | H04L 41/0856 |

OTHER PUBLICATIONS

U.S. Appl. No. 13/086,779, Shun Tanaka Tom Haapanen Jim Vopni, Device Management System Including Reporting Server, Pending (US 2012/0266073 A1).

U.S. Appl. No. 13/758,082, Kenji Hagiwara Tom Haapanen Arturo Hung Tse, Device Managemt Apparatus, System and Method Including Remote Configuration of Device Preferece Settings, Pending (US 2014/0222980 A1).

U.S. Appl. No. 13/758,116, Greg Melendez Tom Haapanen, Dynamic User Interface for Device Management System, Pending (US 2014/0223325 A1).

U.S. Appl. No. 13/758,110, Greg Anderson Tom Haapanen Kenji Hagiwara, Device Management System, Apparatus and Method Configured for Customizing a Power Filter, Patented (U.S. Pat. No. 9,130,838).

U.S. Appl. No. 13/855,083, Tom Haapanen, Click-to-Print System, Apparatus and Method, Patented (U.S. Pat. No. 9,122,433).

U.S. Appl. No. 13/924,798, Tom Haapanen, Access Control System and Method for Mobile Printing, Patented (U.S. Pat. No. 8,891,106).

U.S. Appl. No. 14/735,251, Tom Haapanen Qinlei Fan, Offline Mobile Capture, Pending.

U.S. Appl. No. 14/926,978, Tom Haapanen Matt Cecile, System, Apparatus and Method for Secure Operation of Image Forming Device, Pending.

U.S. Appl. No. 14/934,093, Tom Haapanen Matt Cecile, System, Apparatus and Method for Tracking and Managing Devices, Pending.

U.S. Appl. No. 15/015,619, Tom Haapanen Matt Cecile, System, Apparatus and Method for Easy Access to Casual or Guest Printing, Pending.

U.S. Appl. No. 15/088,901, Tom Haapanen, System, Apparatus and Method Configured to Detect, Analyze and/or Report Impact to Output Device, Pending.

U.S. Appl. No. 15/090,124, Tom Haapanen Matt Cecile, Device Management Based on Tracking Path Taken by User, Pending.

U.S. Appl. No. 15/090,510, Tom Haapanen Matt Cecile, Locating and Tracking Missing or Relocated Devices, Pending.

U.S. Appl. No. 14/735,251 of Tom Haapanen et al., filed Jun. 10, 2015.

U.S. Appl. No. 14/926,978 of Tom Haapanen et al., filed Oct. 29, 2015.

U.S. Appl. No. 14/934,093 of Tom Haapanen et al., filed Nov. 5, 2015.

U.S. Appl. No. 15/015,619 of Tom Haapanen et al., filed Feb. 4, 2016.

U.S. Appl. No. 15/088,901 of Tom Haapanen, filed Apr. 1, 2016.

U.S. Appl. No. 15/090,124 of Tom Haapanen et al., filed Apr. 1, 2016.

U.S. Appl. No. 15/090,510 of Tom Haapanen et al., filed Apr. 4, 2016.

* cited by examiner

| Configuration Records ||||
|---|---|---|---|
| User | Session ID | Time Stamp | Number of Devices Serviced |
| SMoss | 1 | 12:13 PM (05/02/2015) – 5:36 PM (05/02/2015) | 3 |
| RChanning | 9 | 1:00 PM (12/05/2015) – 7:45 PM (12/05/2015) | 17 |
| KBrown | 4 | 8:32 AM (07/21/2015) – 3:01 PM (07/21/2015) | 0 |
| CMoore | 8 | 10:56 AM (01/01/2015) – 9:44 PM (01/01/2015) | 10 |

Fig. 19A

| Configuration Records for User SMoss ||||||
|---|---|---|---|---|---|
| Session ID | Timestamp | Devices Configured | Configuration Successful? (Template used) | Historical Data | Usage Counter Data | Analytical Data |
| 1 | 12:13 PM (05/02/2015) – 5:36 PM (05/02/2015) | MFP B | Yes (Template S) | MFP B Historical Data | MFP B Usage Counter Data | MFP B Analytical Data |
|  |  | Printer X | Yes (Template D) | Printer X Historical Data | Printer X Usage Counter Data | Printer X Analytical Data |
|  |  | Copier Y | No (Template E) | Copier Y Historical Data | Copier Y Usage Counter Data | Copier Y Analytical Data |
| 2 | 1:05 PM (11/25/2015) – 6:09 PM (11/25/2015 | Scanner R | No (Template F) | Scanner R Historical Data | Scanner R Usage Counter Data | Scanner R Analytical Data |

Fig. 19B

CONFIGURING DEVICES USING DEVICE MANAGEMENT TEMPLATES

TECHNICAL FIELD

This disclosure relates to systems, apparatuses, methodologies and other tools for maintaining devices that can be configured by applying settings thereto, and more specifically, tools including provisions to apply settings to a device, based on or from configuration templates obtained from a device management server.

BACKGROUND

In the current information age, information technology (IT) tools are extensively used in enterprises and other organizations in order to facilitate output, communication and processing of information, documents, data, etc. Indeed, it is now rare to find a workflow in an enterprise that does not employ IT tools. The number of IT assets [such as computers, printers, scanners, multi-function devices (MFDs), other output devices] is generally increasing and maintenance of such devices and assets can be a burden.

Conventionally, configuration settings were performed locally at a device, by manual manipulation of physical switches to change device settings and/or by setting by hand on an operation panel. Devices are increasingly designed to permit settings to be adjusted or updated via built-in web servers and in many instances configuration capabilities may be provided in an automated manner through a network connection. Further, device management tools are commonly employed to monitor, manage and configure output devices on a company's network, and may be used to verify that the configuration of a device has been set correctly, and not changed, and to confirm thereby that the device is secure, correctly configured and works consistently.

However, such web pages and automated configuration provisions, while enabling remote configuration, require the device to be connected to a network and reachable by an IP address. There are circumstances when such updates, maintenance or servicing cannot be performed through the network. This can be the case for devices not connected to networks, devices connected to private or secure network segments, or devices behind a local firewall. Additionally, a company that does not have the necessary infrastructure to run a device management tool, or that chooses not to use such tools, typically has no mechanism for easily configuring its devices.

In such circumstances, it may be necessary to send a service technician on-site to perform updates, maintenance or servicing which may include adjusting or updating device settings. In, for example, the case of output devices, the typical device is designed to have many structural parts and functional parts and to operate in an automated manner, and consequently it commonly has dozens, if not hundreds or even thousands of settings. While service technicians, through extensive experience, may start to appreciate such fact, it is rare for such a technician to remember all of the settings of any device, much less all of the devices that the technician may be tasked to service. Further, the conventional approach requires each setting to be set individually, risking human error.

SUMMARY

Various tools (for example, a system, application software, a method, etc.) can be provided to service technicians or administrators to apply settings to a device, when such settings cannot be applied to the device through a network connection.

For example, a configurator application may be provided to permit a technician, or an administrator (e.g., a member of the company's staff, or employed by the supplier of a device, or by another company), to connect by point-to-point connection at the device using a laptop, a tablet, a mobile phone, another similar mobile device, etc., automatically identify the device, check its configuration, choose a configuration template either manually or automatically, and then apply those configuration settings from the template (with or without selections and/or adjustments) to the device.

In another aspect, a configurator application may be configured to obtain or download configuration templates from a device management server on a regular basis (e.g., following a schedule), or on demand (e.g., each time the configurator application connects to the device management server), or as needed (e.g., when a configuration template for servicing a device is not locally available on the host).

In another aspect, configuration templates provided to a configurator application may depend on user credentials of the user of the configurator application, and upon authentication of such user credentials, the configurator application communicates with the device management server to determine devices to be serviced by the user, and provides a list of such devices to be serviced, for display via the application user interface.

In another aspect, a configurator application may be configured to permit a user to operate in (i) automatic mode in which settings in a configuration template are applied in the order specified, upon confirmation by the user (but without the application user interface permitting the user to edit the settings), (ii) guided mode in which the application user interface permits the user to specify one or more groups of settings to skip, and (iii) free mode in which the application user interface permits the user to select or unselect each setting in the configuration template and rearrange an order of the settings. Such operation mode may be user-specific, device-specific or a combination of both.

A configurator application may include other aspects to integrate with a device management system. For example, the configurator application may be configured to maintain a record in connection with a configuration or validation process performed or being performed, and upon the configurator application connecting with the device management server, the configurator application uploads the record to the device management server. Further, a configurator application may be configured to collect device information or data from, in addition to permitting the user to configure, a device. For example, in a case that the current operating status of the device requires repair action, the configurator application records (i) an operating status of the device after the repair action is performed and (ii) the repair action, in association with the operating status before the repair action, in a device record stored locally on the host terminal, and upon the configurator application connecting with the device management server, the configurator application uploads the device record from the host terminal to the device management server. In another example, upon the configurator application connecting with the device, the configurator application retrieves various data captured by the device (such as, e.g., usage count, a history log, etc.), and stores the retrieved data locally on the host terminal, and upon the configurator application connecting with the device management server, the configurator application uploads the data to the device management server.

The aforementioned and other aspects, features and advantages are discussed infra.

BRIEF DESCRIPTION OF THE DRAWINGS

The aforementioned and other aspects, features and advantages can be more readily understood from the following detailed description with reference to the accompanying drawings wherein:

FIG. 19A shows a table of an example of configuration records for multiple technician users;

FIG. 19B shows a table of an example of configuration records for a technician user.

DETAILED DESCRIPTION OF EMBODIMENTS

Figure 1A:
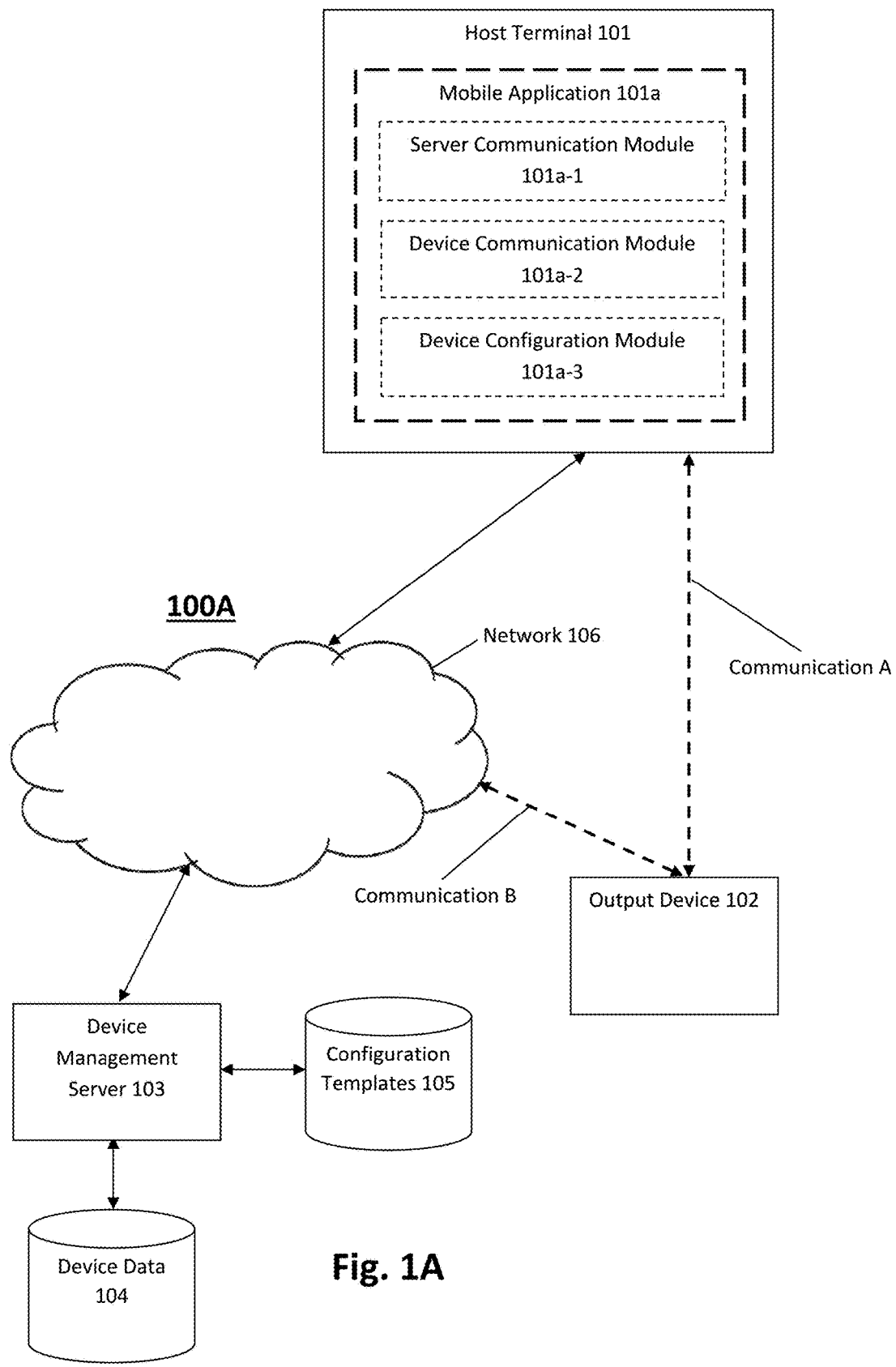
FIG. 1A shows a block diagram of a system that can include various provisions to permit a technician configurator application or another mobile application to apply settings from a configuration template to configure a device, according to an embodiment of this disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate device maintenance and management are discussed herein, with reference to examples in which a configurator application is provided to a technician or administrator, to configure, or perform another service or maintenance process to, an output device. It should be appreciated by those skilled in the art that any one or more of the various aspects, features and advantages discussed herein may be embedded in the application, in a device management system for various types of devices and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1A shows schematically a system 100A that includes a host terminal 101, an output device 102, a device management server 103, a device database 104 and a configuration templates database 105. Each of the host terminal 101, the output device 102 and the device management server 103 is configured to connect to a network, such as network 105.

The host terminal 101 can be any computing device, including but not limited to a tablet or notebook computer, a PDA (personal digital assistant), another mobile information terminal, etc., that can communicate with other devices through the network 105.

The host terminal 101 hosts mobile application (also referred to herein as a "configurator application" or "technician configurator application") 101*a* which includes a server communication module 101*a*-1, a device communication module 101*a*-2 and a device configuration module 101*a*-3.

The server communication module 101*a*-1 communicates via a network interface disposed in the host terminal 101 to obtain configuration templates from the device management server 103. Such communication may be performed over the network 105. For example, the technician configurator application 101*a* may automatically (e.g., based on a schedule) send a request through the server communication module 101*a*-1 to the device management server 103 for the configuration templates. In response, the device management server 103 may request for authentication by the user of the host terminal 101. Such authentication may be automatic and the technician user may have the user terminal 101 automatically send the technician user information to the device management server 103 when requested for the purpose of authenticating the technician user.

After authentication is performed, the device management server 103 may use the technician user information (e.g., name, user identification number, profile, etc.) to determine automatically the output devices (e.g., 102) that can be accessed by the technician user for applying configuration settings. The technician user may only be permitted to configure certain output devices. Such permission may be given to the user by an IT administrator (or application administrator). Thus, after receiving the technician user information, the device management server 103 may determine which output devices can be accessed by the technician user for performing configuration. Once the device management server 103 determines the output devices, the device management server 103 sends one or more configuration templates associated with the previously determined output devices, to the host terminal 101 via the server communication module 101*a*-3.

A configuration template may be a template that include settings (e.g., display screen arrangement, paper output options, etc.) for an output device. For example, such a template may be created by an IT administrator or application administrator and uploaded to the device management server 103. In another example, there may be more than one configuration template received from the device management server 103. Each configuration template may be specifically created by an IT administrator or application administrator or device administrator (the term "administrator" is used infra to refer to any one or more of IT administrator, application administrator or device administrator) for a particular output device. There may be a configuration template for output devices of a particular model, in a specific department, or part of a group. Further, there may be configuration templates created specifically for individual devices as well. In yet another example, there may be different types of configuration templates. There may be a configuration template for rearranging icons on a display screen of an output device, a configuration template for finishing options (e.g., stapling, hole-punching, etc.), a configuration template for recording operations history, etc. Thus, more than one configuration template can be used for an output device.

The device communication module 101*a*-2 communicates with the output device 102 via point-to-point communication in order to obtain a device identifier corresponding to the output device 102. It is possible for both the host terminal 101 and the output device 102 to communicate with each other without going through the network 107. For example, the output device 102 is connected to the network via communication line B (e.g., Ethernet, wireless, etc.). However, communication line B may not always be stable, provide adequate transfer (e.g., download, upload, etc.) speed or be functioning correctly. For example, in this case, communication line B may be presently not working. Thus, host terminal 101 may communicate with the output device 102 via the device communication module 101*a*-2 and communication line A. In such case, communication line A may include short-range wireless communication (e.g., Bluetooth) or a simple wired connection (e.g., USB cable, Ethernet, etc.).

The device configuration module 101*a*-3 communicates via the device communication module 101*a*-3 with the output device 102 in order to receive configuration information regarding the output device 102. The technician user may wish to view the current configurations that are associated with the output device 102 before determining whether he or she should apply the configuration settings in the configuration templates downloaded from the device management server 103. After receiving the current configuration information, the device configuration module 101*a*-3 may display the current configuration information to the technician user. Simultaneously, the device configuration module 101*a*-3 may retrieve one or more configuration templates associated with the output device 102 that were previously obtained from the device management server 103. Such retrieval may be performed by using the previously obtained device identifier to find the corresponding configuration template(s). The device configuration module 101*a*-3 may not have stored any configuration templates. Instead, the device configuration module 101*a*-3 may download such configuration templates from the device management server 103 on demand.

After viewing the current configuration settings, the technician user may decide to apply the configuration settings from the configuration template(s) corresponding to the device identifier of the output device 102. In such case, the device configuration module 101*a*-3 may apply the configuration settings in the configuration template(s) by converting the configuration settings into a set of configuration setting instructions that are acceptable as input by the output device 102 and then sending such configuration setting instructions to the output device 102.

The output device 102 may be, for example, an MFP, a printer, a facsimile machine, a scanner, etc. Further, the terms "printer" and "printer device" are used hereinafter generically to include any output device having a printing or plotting functionality, and include multifunction devices having a copy and/or scanning functionality in addition to the printing or plotting functionality.

The device management server 103 manages and administers the device data database 104 and a configuration templates database 105. The device management server 103 may periodically obtain device data (e.g., device model, MAC Address, IP Address, functions, properties, etc.) from the output device 102 and store such device data into the database 104. Further, the device management server 103 may also communicate with the host terminal 101 in order to authenticate the technician user who is currently using the host terminal 101. After authenticating the technician user, the device management server 103 may provide configuration templates that correspond to output devices that the technician user is permitted to configure.

The device management server 103 may also provide unique security credentials corresponding to each output device accessible by the technician user. For example, in order to configure each output device, a security credential unique to each output device may be required. Thus, after verifying the user, the device management server may provide the configuration templates along with one or more security credentials corresponding to each output device accessible by the technician user. As a result, when the technician user starts to configure an output devices assigned to the user or her, the technician configurator application 101a may use the stored security credentials to access the output device for the technician user.

In addition, the device management server 103 may also receive (from the host terminal 101) collected data (e.g., status information, historical data, meter reads, configuration information) corresponding to the output devices configured by the technician user. Once the device management server 103 has received the data from the technician configurator application 101a, the device management server may integrate this information into the device data database 104 so that all views (e.g., reports, dashboards, queries, etc.) can see device information in a uniform manner regardless of whether such information was collected by the technician configurator application, or in the usual manner over the network. Further, the device management server notifies (e.g., via e-mail, SMS messaging, etc.) an administrator (or another designated person) of important events (e.g., devices whose configuration was incorrect, new devices identified by the technician configurator application, devices assigned to the technician user but not collected in the technician configurator application, unauthorized devices uploaded by the technician configurator application, etc.).

The device data database 104 includes information regarding the output devices that are connected to network 106. For example, the device database 104 includes collected data (e.g., status information, historical data, meter reads, configuration information) corresponding to the output devices configured by the technician user and may also include important events (e.g., devices whose configuration was incorrect, new devices identified by the technician configurator application, devices assigned to the technician user but not collected in the technician configurator application, unauthorized devices uploaded by the technician configurator application, etc.).

The configuration templates database 105 includes configuration templates corresponding to each output devices 102 connected to the network 106. On the other hand, there may be one or more configuration templates designated to an output device 103. The configuration templates may be designated to a particular technician user.

The network 106 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
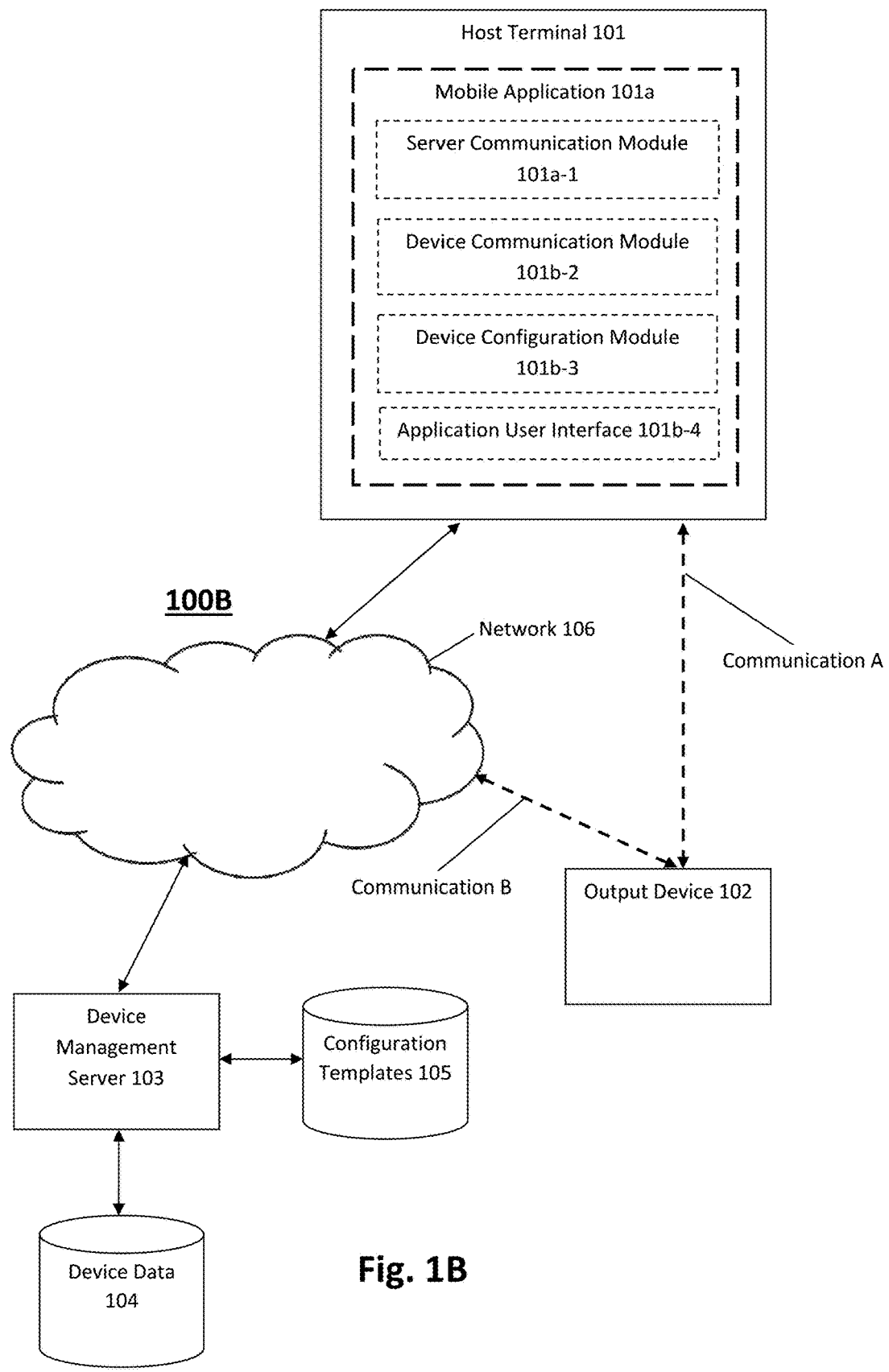
FIG. 1B shows a block diagram of a system that can include various provisions to permit a technician configurator application or another mobile application to apply settings from a configuration template to configure a device, according to another embodiment.

FIG. 1B shows schematically a system 100B for providing output (e.g., print, scan, copy, fax, etc.) services, according to another exemplary embodiment. The system 100B is similar to the system 100A except that the system 100B additionally includes an application user interface 101a-4 in the mobile application 101a.

The application user interface 101a-4 may be a graphical user interface (GUI) from which a technician user can perform operations on. For example, the application user interface 101a-4 may include an authentication user interface portion to permit a technician user of the host terminal 101 to input authentication information via the authentication user interface portion. Once the technician user of the host terminal 101 has been authenticated, the application user interface 101a-4 presents a list of output devices that the technician user can configure. In addition, the application user interface 101a-4 also permits the technician user to select configuration templates that do not correspond to any of the output devices that the technician user has permission to configure. Further, the application user interface 101a-4 also permits the technician user to select one or more configuration templates to be applied to a particular output device.

Otherwise, operations of the elements of the system 100B are similar to those discussed in connection with corresponding elements of the system 100A of FIG. 1A.

Figure 1C:
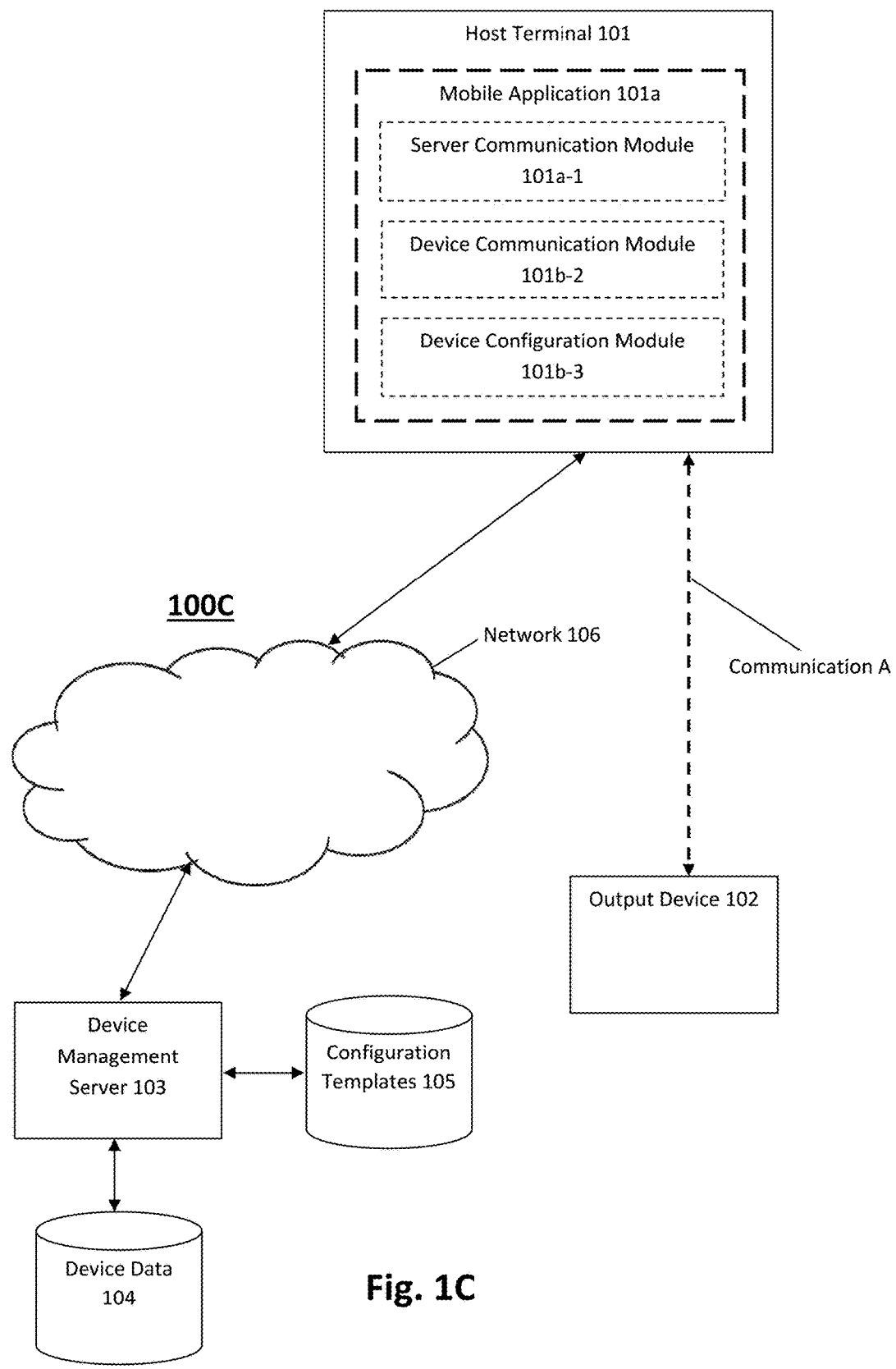
FIG. 1C shows a block diagram of a system that can include various provisions to permit a technician configurator application or another mobile application to apply settings from a configuration template to configure a device, according to yet another embodiment.

FIG. 1C shows schematically a system 100B for providing output (e.g., print, scan, copy, fax, etc.) services, according to another exemplary embodiment. The system 100B is similar to the system 100A except that, in the system 100C, the output device 102 is not connected to the network 106 in any way.

The output device 102 may not always be connected to the network 107. In one example, the output device 102 may be located at a location where there is no place to connect to the network. In another example, the output device 102 may not have any means to connect to a network. However, the host terminal 101 may still be able to connect to the output device 102 via a point-to-point communication. For example, the host terminal 101 may be connected to the output device 102 via a USB cable, Bluetooth, etc. The point-to-point communication may be any communication in which the host terminal 101 is within proximity of the output device 102.

Otherwise, operations of the elements of the system 100C are similar to those discussed in connection with corresponding elements of the system 100A of FIG. 1A.

Figure 2:
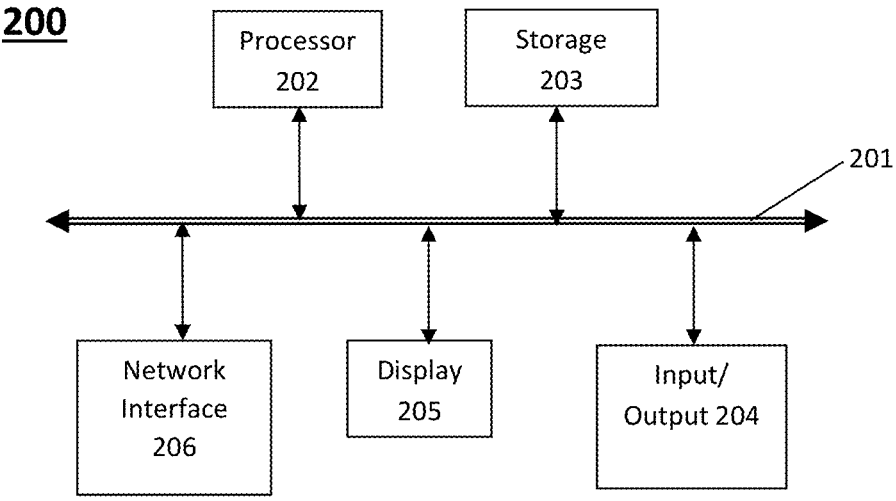
FIG. 2 shows a block diagram of an example of a configuration of a computing device that can be configured by software to operate as a device management server.

FIG. 2 shows an exemplary constitution of a computing device that can be configured (for example, through software) to operate (at least in part) as a device management server (e.g., 103 in FIGS. 1A-1C). In FIG. 2, apparatus 200 includes a processor (or central processing unit) 202 that communicates with a number of other components, including memory or storage device 203, display 205, network interface 206, and other input/output (e.g., keyboard, mouse, etc.) 204, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the management apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion. Further, the apparatus 200 is not limited to a server or computer, but can be manifested in any of various devices that can be configured to communicate over a network and/or the Internet.

Figure 3:
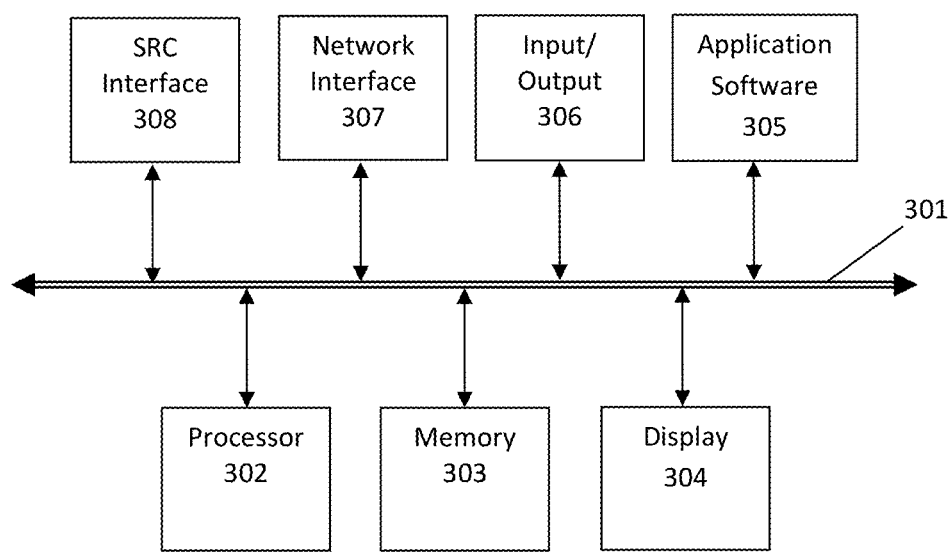
FIG. 3 shows a block diagram of an example of a configuration of a mobile device that can be configured to be a host terminal for a technician configurator application or another mobile application.

An exemplary constitution of the host terminal 101 of FIGS. 1A-1C is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306, network interface 307 and SRC interface 308, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 107 of FIG. 1).

The SRC interface 308 can be a combination of one or more hardware provisions (e.g., radio antenna) and system software components [e.g., a Bluetooth subsystem, an NFC (near field communication) subsystem, an infrared communication subsystem, etc.] that enables the terminal 300 to conduct direct, peer-to-peer, point-to-point communication with another device having complementary SRC provisions.

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
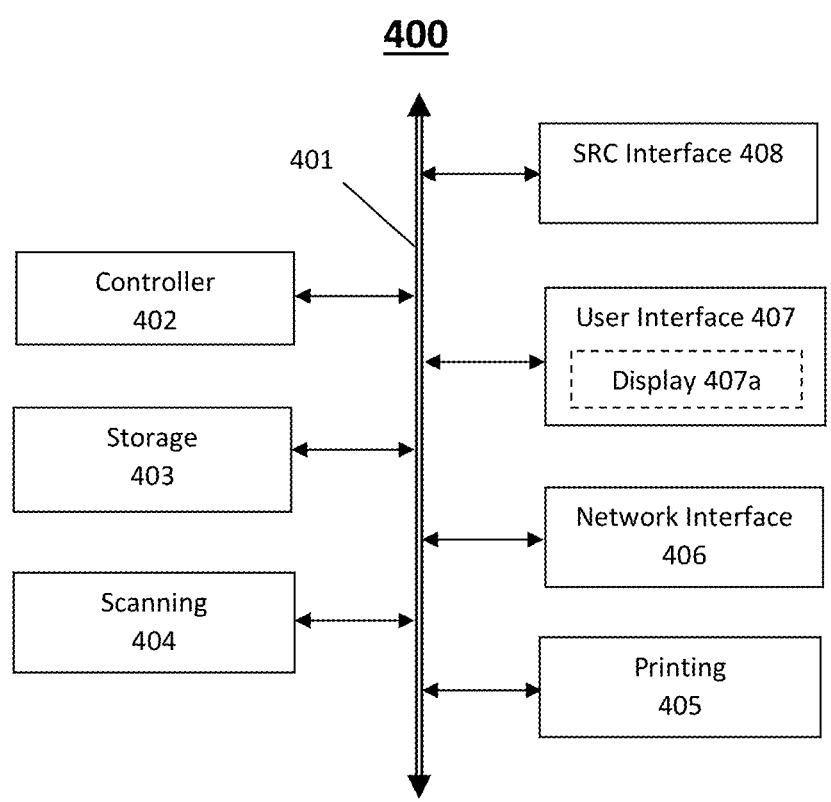
FIG. 4 shows a block diagram of an example of a configuration of a multi-function device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407 and a SRC interface 408.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407a) for inputting information or requesting various operations. Alternatively, the user interface 407 and the display screen may be operated by a keyboard, a mouse, a remote control, voice recognition, or eye-movement tracking, or a combination thereof.

The SRC interface 408 can be a combination of hardware provisions (e.g., radio antenna, etc.) and system software components [e.g., a Bluetooth subsystem, an NFC (near field communication) subsystem, an infrared communication subsystem, etc.] that enables the output device 400 to conduct direct, peer-to-peer, point-to-point communication with another device (e.g., terminal 300) having complementary SRC provisions (e.g., SRC 308).

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 5A:
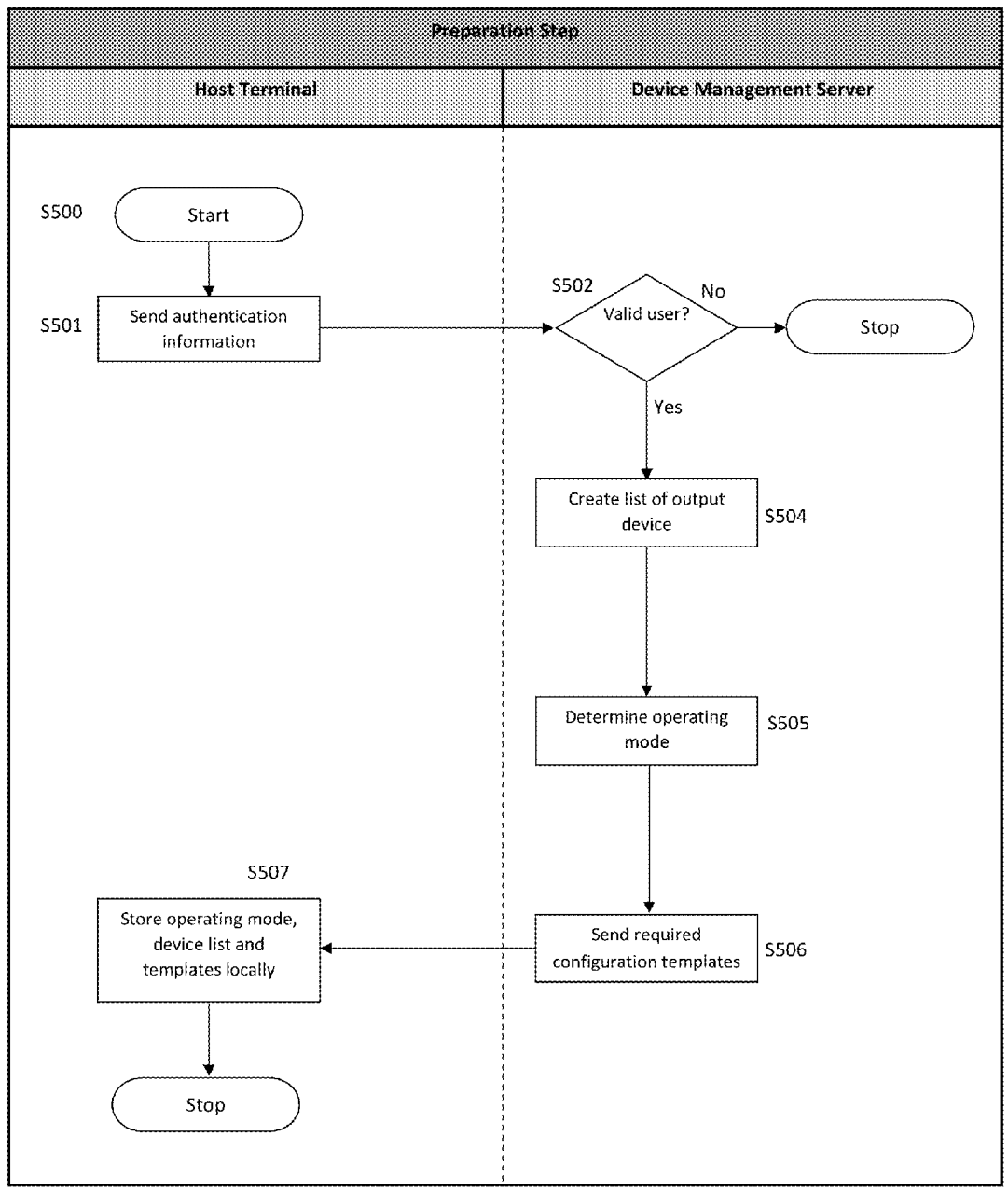
FIG. 5A shows a schematic diagram of an example of communication flow, or method performed, in any of the systems of FIGS. 1A-1C (or an equivalent)

FIG. 5A shows a process that can be performed in, for example, any of the systems 100A-100C (illustrated in FIGS. 1A-1C, respectively).

In a preparation step (which may be performed according to a predetermined schedule), a technician user may connect his host terminal to a device management server via a connection means (e.g., Ethernet, wireless network, mobile network, etc.). Such process commences (S500) when a technician configurator application on the host terminal belonging to the technician user sends authentication information to the device management server (S501). Next, the device management system may automatically perform authorization to automatically identify output devices that are to be checked by the technician user (S502). In the case that the technician user is not validated (S502, no), the process ends. On the other hand, in the case that the technician user is validated (S502, yes), the device management server creates a list of output devices that the technician user has authorized access to configure (S504).

The list of output devices may not include every output device that the technician user has access to. The list of output devices may just include a subset. Such subset of output devices may be determined by one or more criteria (e.g., automated determination of preventive maintenance, recent or current device errors or warnings, helpdesk tickets or request received from end users, and administrator-managed maintenance schedule, technician and output device physical location, the device manufacturer model, an ad-hoc selection of devices made by an administrator of the device management system prior to this step, an ad-hoc selection of device by the technician during this step, etc.). On the other hand, the device management system may also determine the associated configuration templates and security credentials for each output device.

After creating the list of output devices, the device management server may determine an operating mode of the technician configurator application (S505). Such operation mode may include an automatic mode to automatically perform one or more checks (e.g., status, historical data, meter reads, retrieve the current configuration, apply new configuration, etc.), a guided mode to permit the technician user to skip some of the checks (but have the technician configurator application automatically perform the rest) and a free mode which permits the technician user to select which checks to perform. Next, the device management server determines the configuration templates that are associated with the output devices in the list of output devices.

Then the device management server sends the operating mode (e.g., automatic, guided, free, etc.), the list of output device and the determined configuration templates to the host terminal (S506). The technician configurator application may allow the technician user to select which configuration templates are to be downloaded into the host terminal. On the other hand, the technician user may also request the device management server for configuration templates that are not associated with any of the output devices in the list of output devices. After receiving the operating mode, the list of output device and the determined configuration templates from the device management server, the technician configurator application locally stores the operating mode, the list of output device and the determined configuration templates onto the host terminal (S507). Afterwards, the process ends.

Figure 5B:
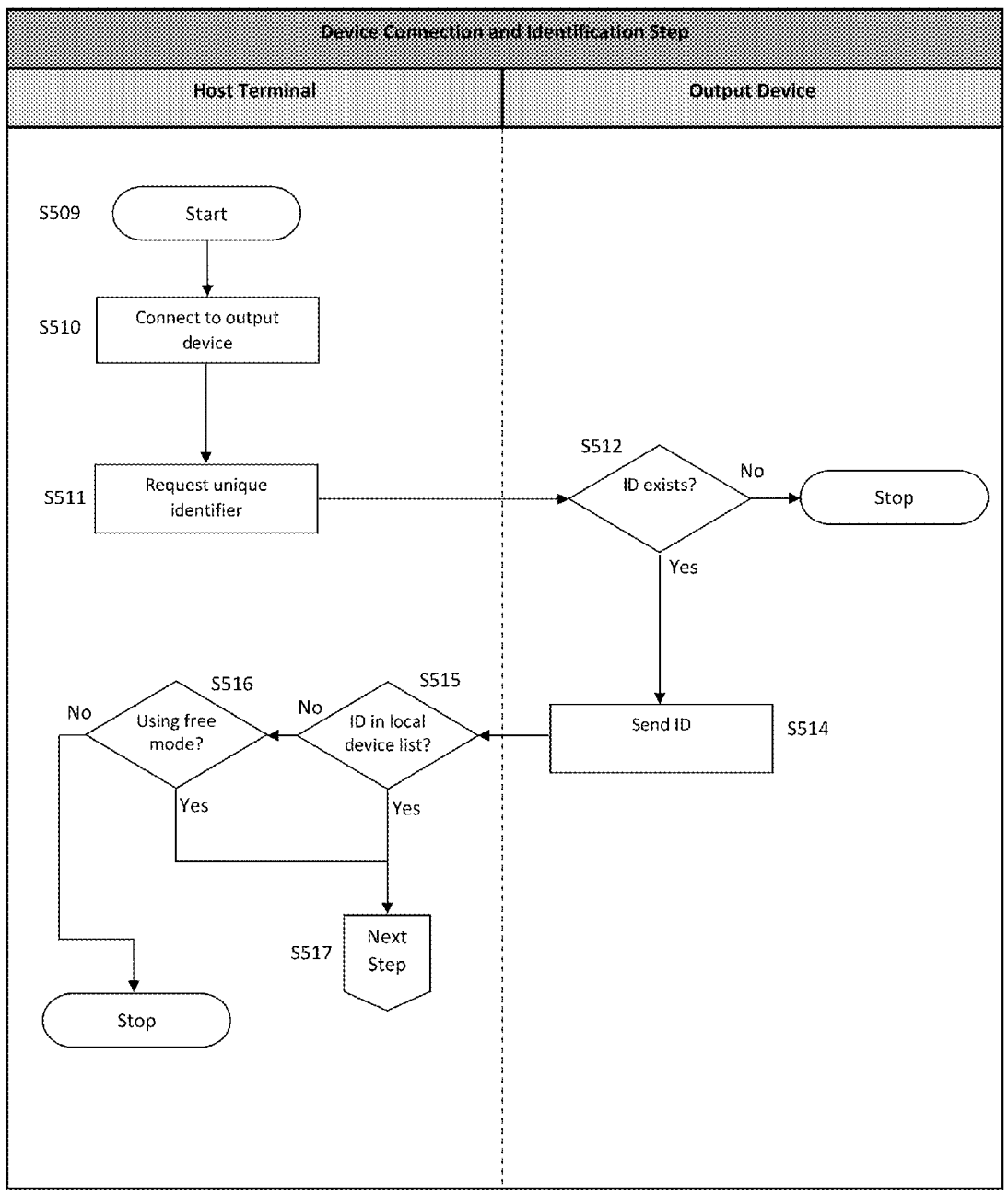
FIG. 5B shows a schematic diagram of an example of communication flow, or method performed, in any of the systems of FIGS. 1A-1C (or an equivalent)

FIG. 5B shows a process that can be performed in, for example, any of the systems 100A-100C (illustrated in FIGS. 1A-1C, respectively).

In the device connection and identification step, the technician user may be at an output device that he or she should be configuring. Such process commences (S509) when the technician user connects (e.g., via Ethernet, Wi-Fi, USB, Bluetooth, etc.) his or her host terminal to the output device (S510). Next, a technician configurator application may request (via the host terminal) from the output device, a device identifier that is unique to the output device (S511). For example, the technician configurator application may uniquely identify the output device by querying the output device's serial number, network MAC address, or other similar information that can uniquely identify (either alone or in combination with other information) the output device. In the case that the output device does not have device identifier or cannot be uniquely identified (S512, no), the process ends. Otherwise (S512, yes), the output device sends the device identifier to the host terminal (S514).

Next, after receiving the device identifier, the host terminal determines whether the device identifier is indicated in the list of output devices previously received by the host terminal from the device management server (S515). In the case that the device identifier is in the list of output devices (S515, yes), the technician configurator application moves on to the next step (S517). Otherwise (S515, no), even if the output device can be uniquely identified, but is not a known output device (based on the list of output devices sent by the device management server previously), the technician configurator application determines whether it is operating in the free mode (S516). In the case that the technician configurator application is not operating in free mode (S516, no), the process ends. Otherwise (S516, yes), the technician configurator application moves on to the next step (S517).

Figure 5C:
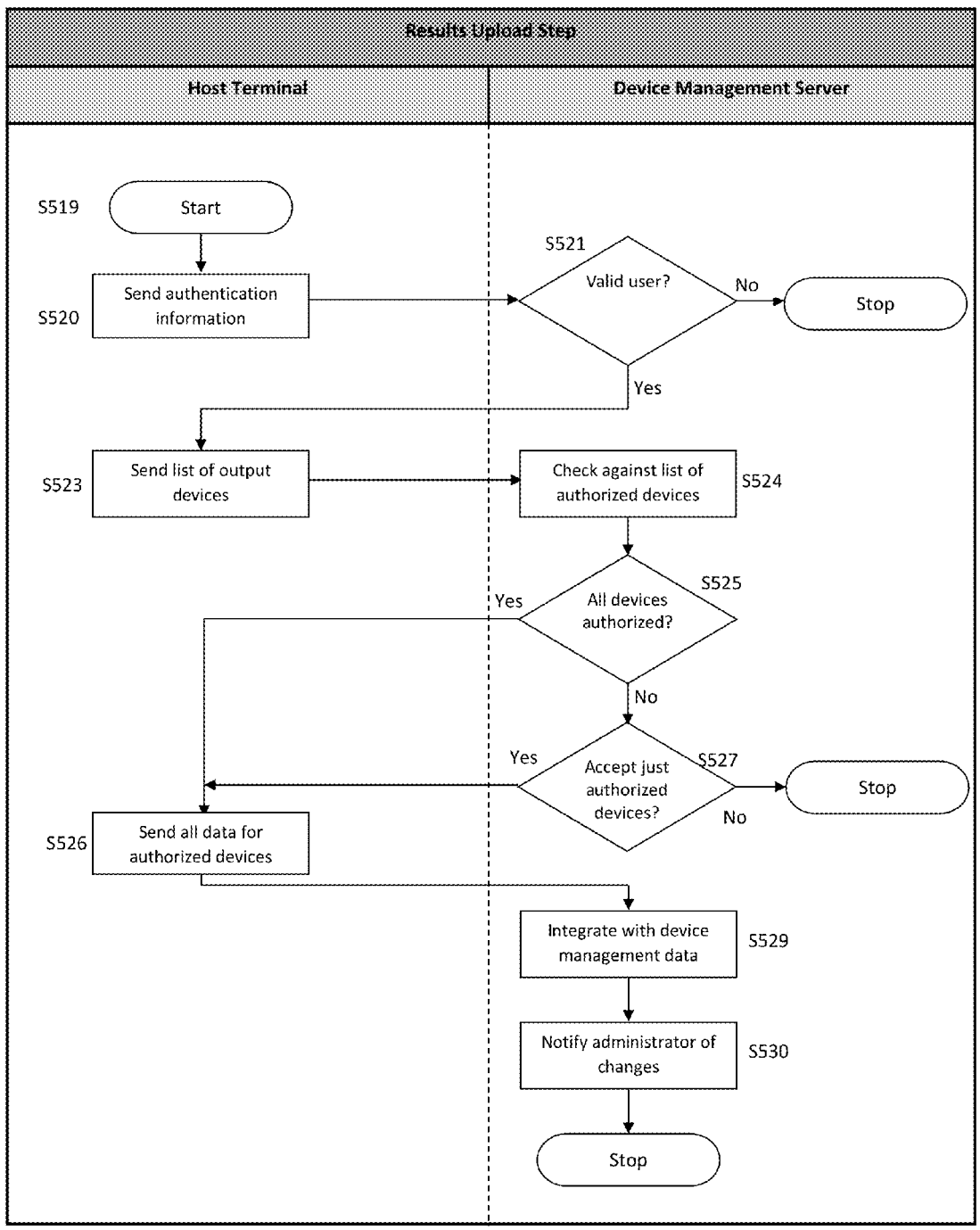
FIG. 5C shows a schematic diagram of an example of communication flow, or method performed, in any of the systems of FIGS. 1A-1C (or an equivalent)

FIG. 5C shows a process that can be performed in, for example, any of the systems 100A-100C (illustrated in FIGS. 1A-1C, respectively).

In a results upload step, the process begins when the technician user connects (e.g., Ethernet, wireless network, mobile network, etc.) his or her host terminal with the device management server (which might be at the end of the day, end of the week, or possibly just before the next preparation step) to upload results of configurations performed on one or more output devices (S519). After connecting with the device management server, the technician configurator application may send authentication information to the device management server (S520). The device management server performs authorization to automatically validate the technician user (S521). In the case that the user is not validated (S521, no), the process ends. Otherwise (S521, yes), the technician user is authenticated and the technician configurator application uploads to the device management server, the list of output devices that the technician configurator application has connected to for configuration and/or data collection (S523).

Afterwards, the device management server may validate the received list of output devices against the list of output devices that the device management server has previously authorized for the technician user (S524). In the case that all of the devices in the received list of output devices are authorized (S525, yes), the device management server requests the technician configurator application to send all collected data (e.g., status information, historical data, meter reads, configuration information) corresponding to the output devices (S526). Otherwise (S525, no) the device management server determines whether it is configured to accept only authorized output devices (S527). In the case that the device management server is not permitted to accept only authorized output devices (S527, no), the process ends. Otherwise (S527, yes), the technician configurator application sends all collected data (e.g., status information, historical data, meter reads, configuration information) corresponding to the output devices to the device management server (S526).

Once the device management server has received the data from the technician configurator application, the device management server may integrate this information into a standard device management database so that all views (e.g., reports, dashboards, queries, etc.) can see device information in a uniform manner regardless of whether such information was collected by the technician configurator application, or in the usual manner over the network (S529). Next, the device management server notifies (e.g., via e-mail, SMS messaging, etc.) an administrator (or another designated person) of important events (e.g., devices whose configuration was incorrect, new devices identified by the technician configurator application, devices assigned to the technician user but not collected in the technician configurator application, unauthorized devices uploaded by the technician configurator application, etc.) (S530). Afterwards, the process ends.

Figure 6:
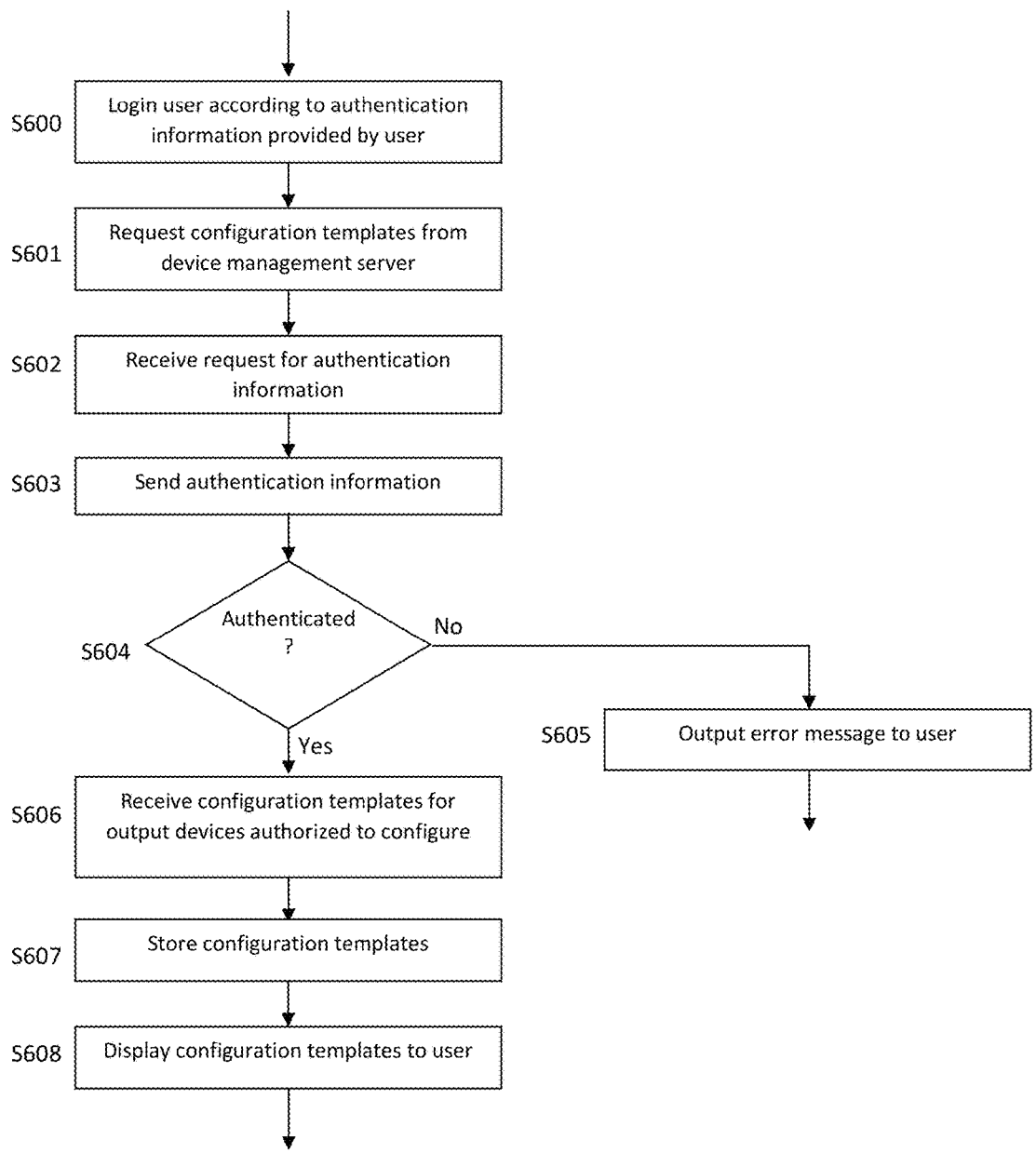
FIG. 6 shows a flow chart of a method that can be performed in any of the systems of FIGS. 1A-1C (or an equivalent)

FIG. 6 shows a method that can be performed by or with a technician configurator application (e.g., 101a) on a host terminal (e.g., 101).

In an exemplary scenario, a technician receives assignments to maintain output devices on a scheduled basis (e.g., daily, weekly, monthly, yearly, etc.), including tasks to configure each output device assigned to him/her, based on configuration templates maintained by a device management server (e.g., 103). One reason, for example, for configuring each output device may be to keep the most-updated configurations on the output devices. Another reason, for example, may be to implement changes specified by management.

The general process starts when the technician user performs a login to the technician configurator application. The technician configurator application may request user credentials from the technician user. For example, the technician user may input the username and password via an onscreen keyboard. In another example, the technician user may alternatively use his or her voice (e.g., voice recognition). Next, after the technician user is authenticated, the technician configurator application may cause the host terminal to communicate with the device management server to retrieve configuration templates associated with output devices that the technician user has permission to configure. After receiving the downloaded configuration templates from the device management server, the technician user may then start to inspect output devices that are assigned to him/her and that correspond to the configuration templates downloaded from the device management server.

Figure 7A:
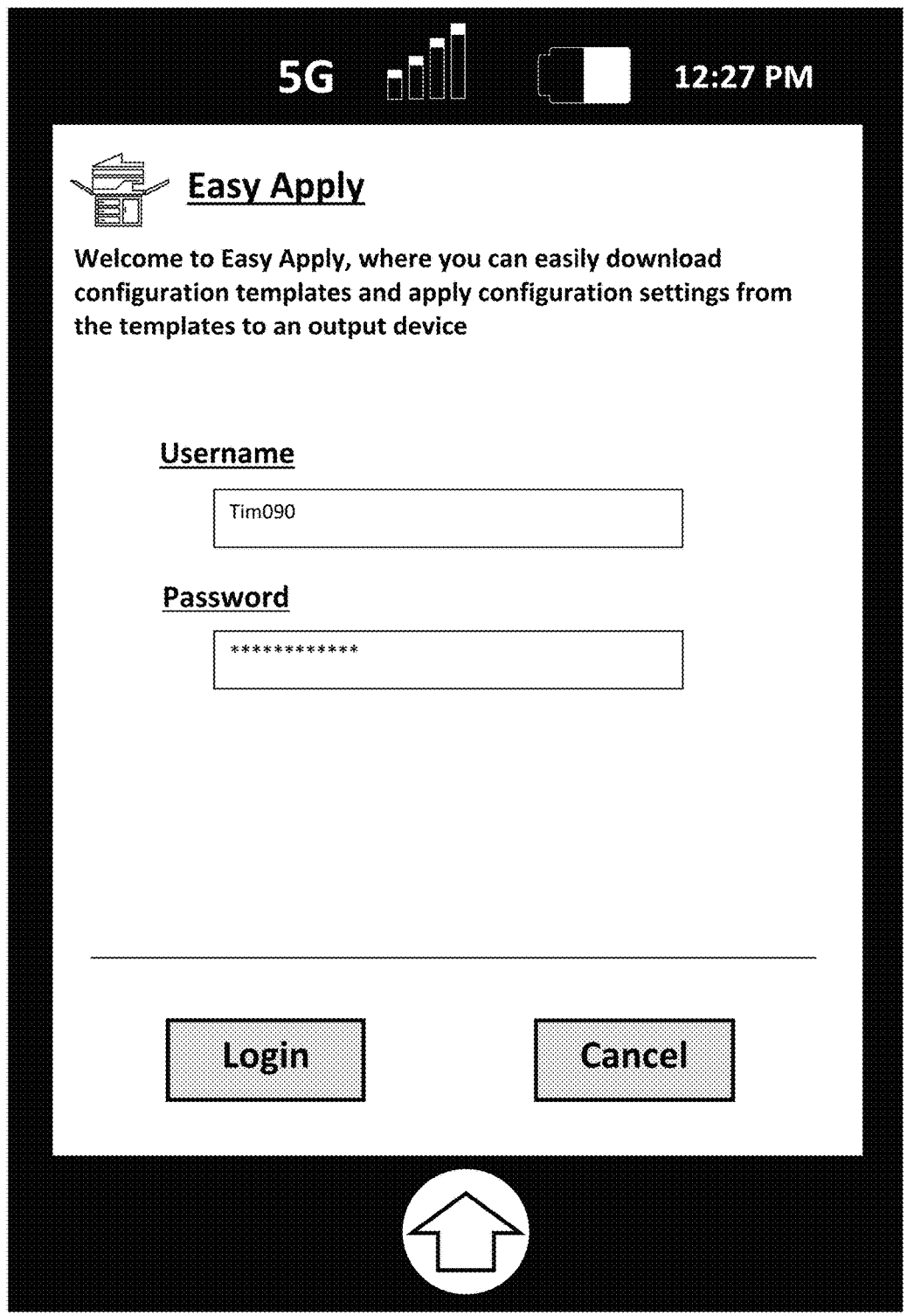
FIGS. 7A-7D show examples of user interface screens that can be provided by a technician configurator application or another mobile application, in any of the systems of FIGS. 1A-1C (or an equivalent)
Figure 7B:
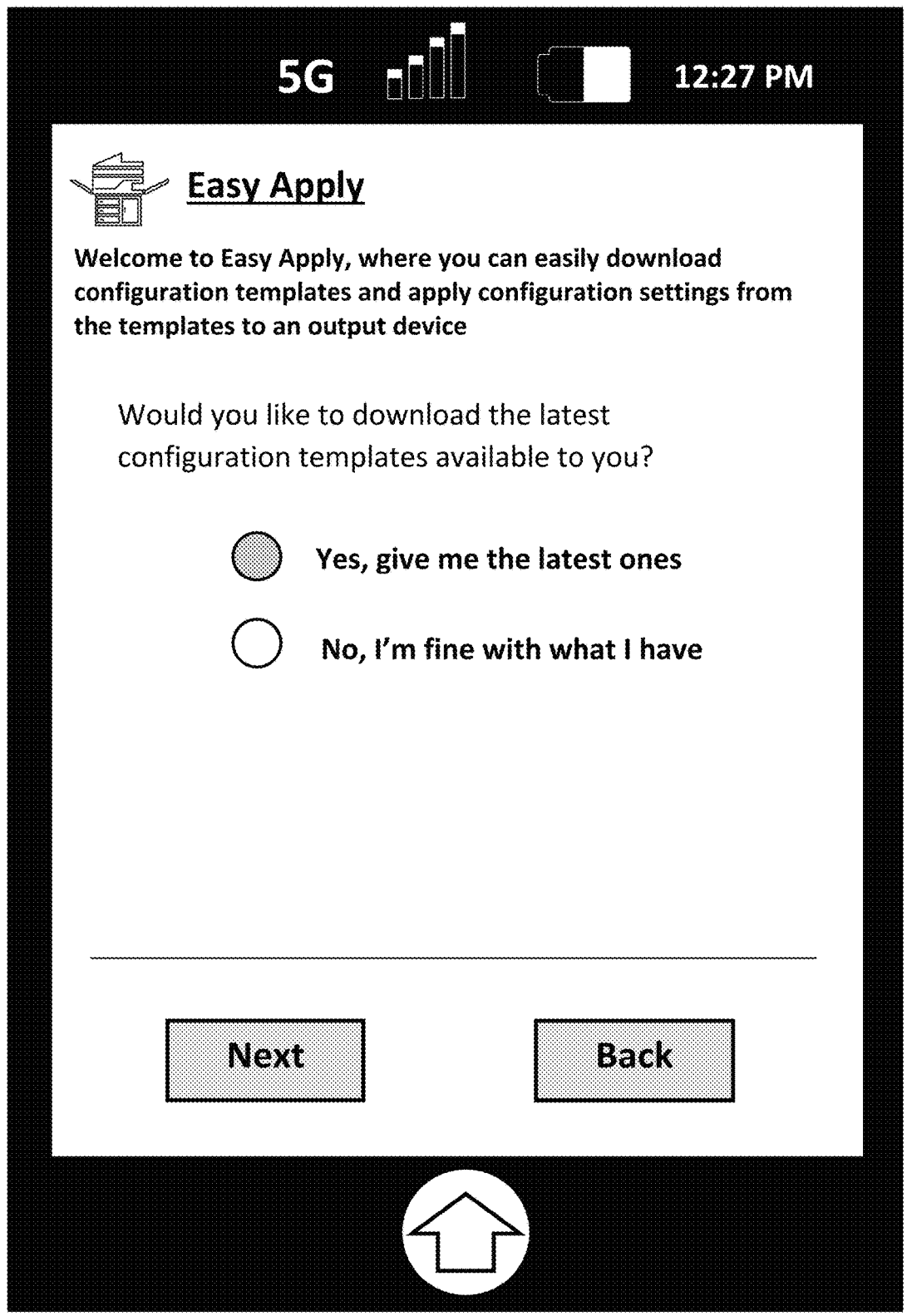

In a more specific process, the technician configurator application provides a graphic user interface (GUI), such as shown in FIG. 7A, to prompt the technician user to input user credentials. After logging in the technician user using the authentication information provided by him/her (S600), the technician configurator application may ask the technician user if he wants to download configuration templates, such as shown in FIG. 7B. In this case, the technician user has selected to download the configuration templates by clicking on the corresponding radio button and then activating the "Next" button. When the technician user logs in, the technician configurator application automatically requests the device management server for the configuration templates.

When the technician configurator application receives such instruction to retrieve the configuration templates from the device management server, the technician configurator application sends such request for the configuration templates to the device management server (S601). In response, the device management server may send a communication back to ask for authentication information (S602). The technician configurator application may reply by sending the authentication information previously provided by the technician user, to the device management server (S603). Next, the technician configurator application receives a communication from the device management server informing the technician configurator application whether the authentication was successful or not (S604).

In the case that the user authentication information was not authenticated by the device management server (S604, no), the technician configurator application outputs an error message to the technician user informing the user that he/she cannot download the configuration templates since the authentication information was not successful (S605). On the other hand, in the case that the authentication was successful (S604, yes), the technician configurator application receives the configuration templates from the device management server (S606). The configuration templates downloaded from the device management server may not include every configuration template that is stored by the device management server. The downloaded configuration templates may be a subset. On the other hand, the downloaded configuration templates may correspond to output devices that may be accessible by the technician user.

Figure 7C:
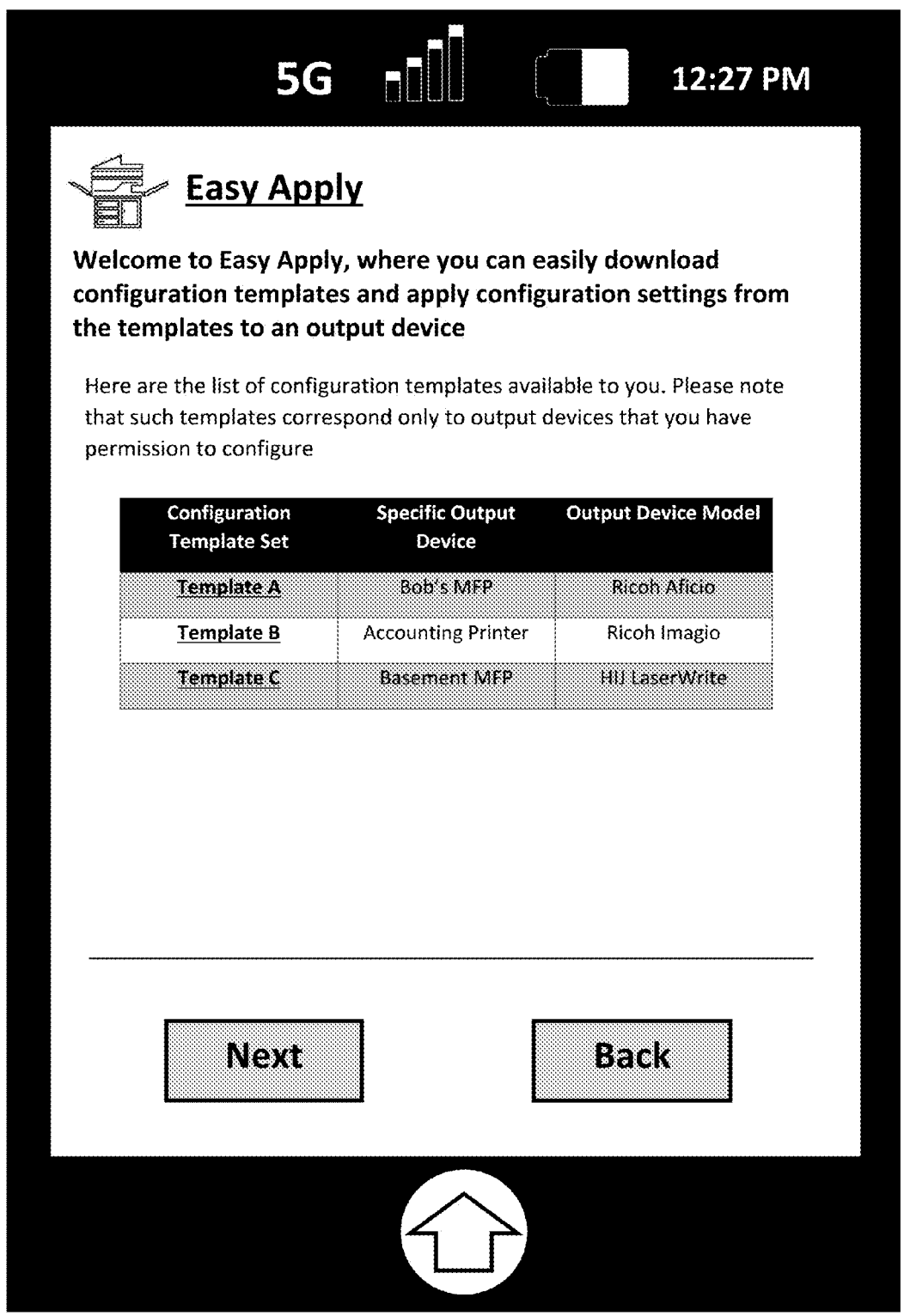

After receiving the configuration templates from the device management server, the technician configurator application may store the received configuration templates (S607). Next, the technician configurator application may present the received configuration templates for the technician user to review (step S608), such as shown in FIG. 7C. As stated before, the technician user may be only permitted to access certain output devices. Thus, the configuration templates downloaded may be associated with such certain output devices. Thus, in one example, the technician user is displayed the configuration template (e.g., Template A, Template B, Template C), the associated (with the template) specific output device monitored by the technician user (e.g., Bob's MFP, Accounting Printer, Basement MFP) and the corresponding output device model (e.g., Ricoh Aficio, Ricoh Imagio, etc.).

Figure 7D:
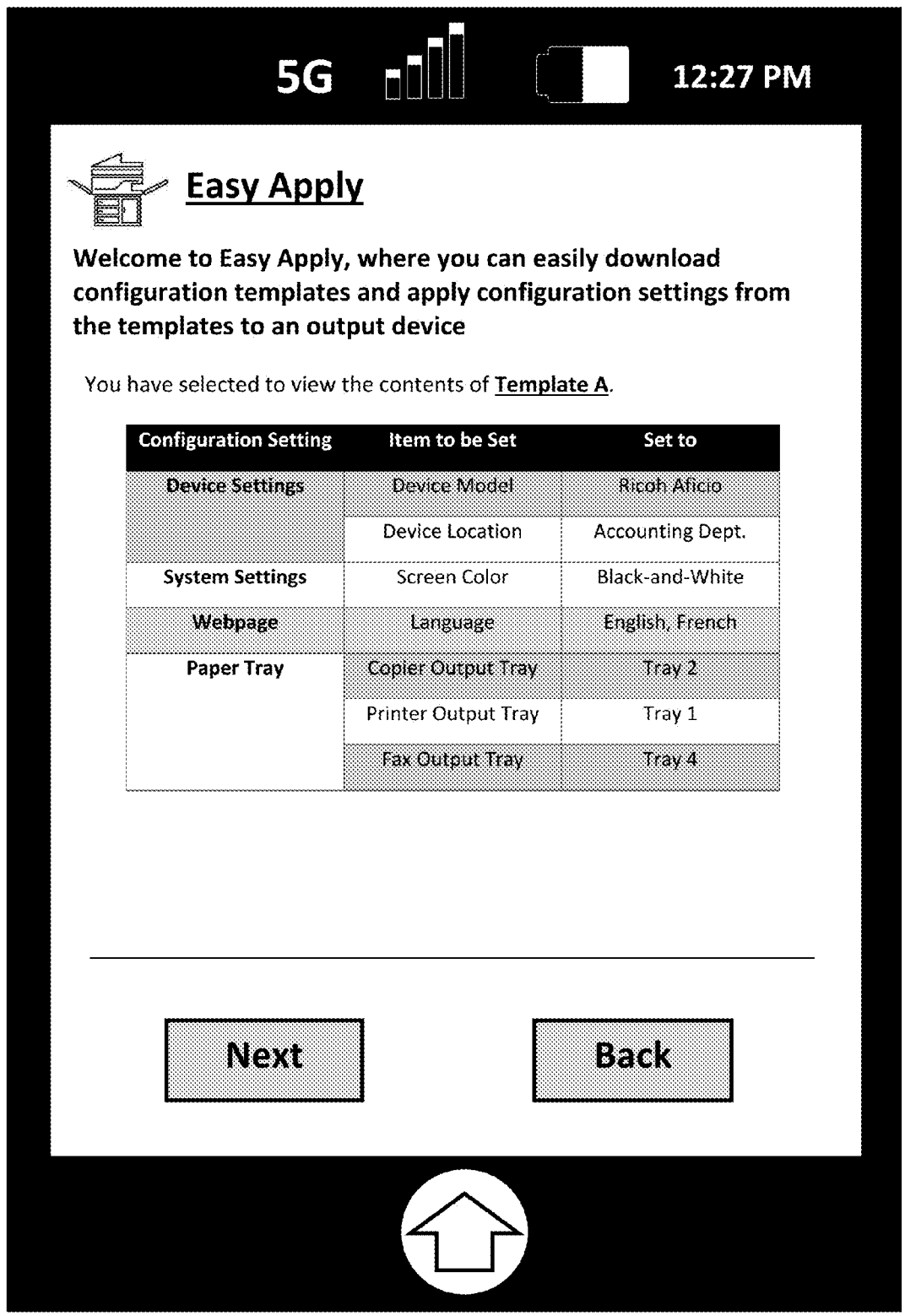

Further, the technician user may also review the contents of each template, such as shown in FIG. 7D. Each configuration template may comprise a configuration setting that includes several items that may or may not be set. For example, there may be a configuration setting that includes the tray that a print job is to be outputted from. As shown, such item is set to be "Tray 1". However, the configuration template may not be created by, for example, an information technology (IT) administrator for a particular device. Each configuration template may be applied to one or more devices depending on the criteria set by the administrator (e.g., device model, device group, device type, etc.).

Figure 8:
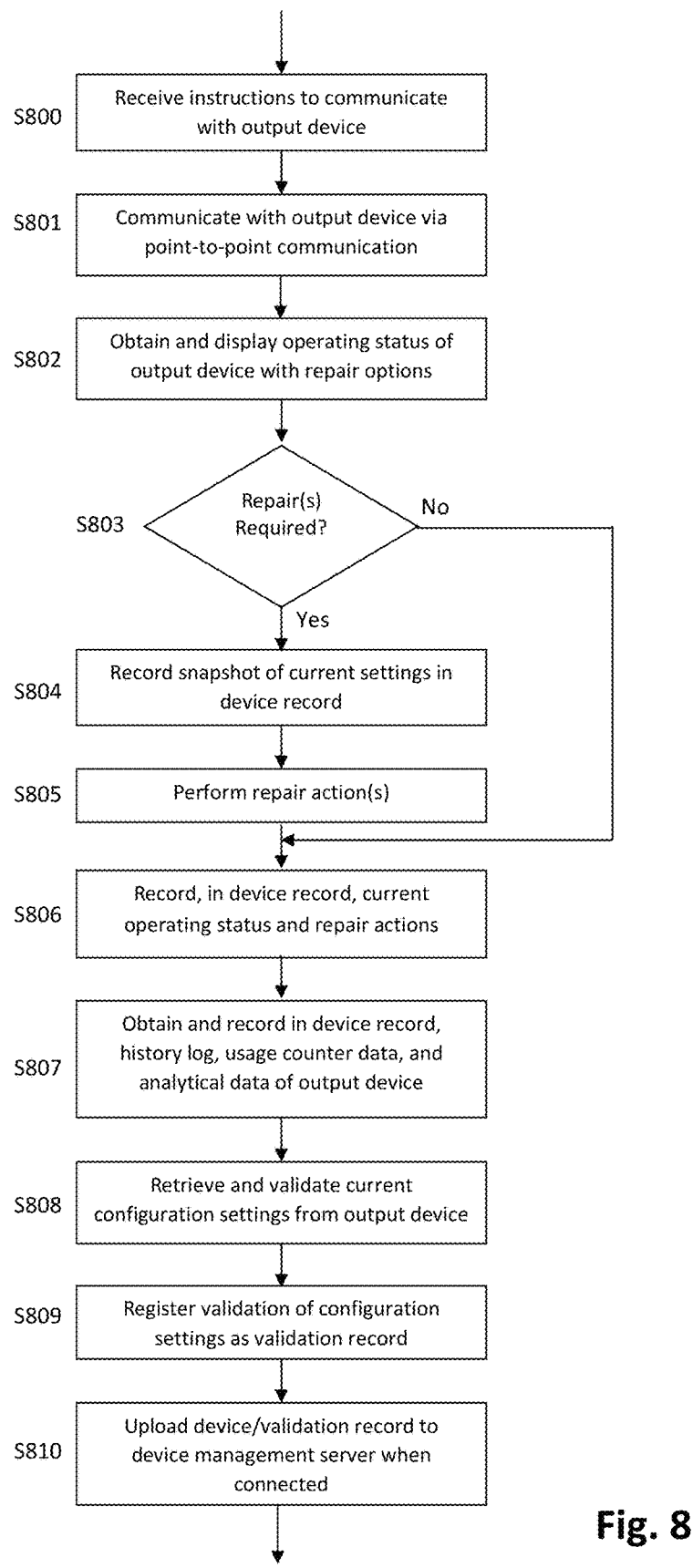
FIG. 8 shows a flow chart of a method that can be performed in any of the systems of FIGS. 1A-1C (or an equivalent)

FIG. 8 shows a method that can be performed by or with a technician configurator application (e.g., 101a) on a host terminal (e.g., 101).

After the technician user has downloaded the configuration templates from the device management server via the technician configurator application, the user may now start to configure output devices that are assigned to him/her. For example, the first output device that the technician user has decided to inspect is "Bob's MFP", which is connected to a network via an Ethernet port and is capable of communicating via point-to-point communication via Bluetooth or via the network. However, this may not always be the case, since the technician user may also inspect output devices that are neither connected to a network nor capable of communicating via wireless means. The technician user may connect with the output device "Basement MFP" via wired means (e.g., USB, serial or parallel cable, etc.).

Regardless of how the communication is performed between the host terminal and the output device, once the technician configurator application receives instructions to communicate with the output device (S800), the technician configurator application commences to perform point-to-point communication with the output device (S801). As discussed previously, such point-to-point communication may include wireless (e.g., Bluetooth, 802.11, etc.) or wired (e.g., USB, cable, cord, etc.) means. For example, point-to-point communication may include any form of communication in which the technician user (or any user) is in proximity with the output device (or any device).

Figure 9A:
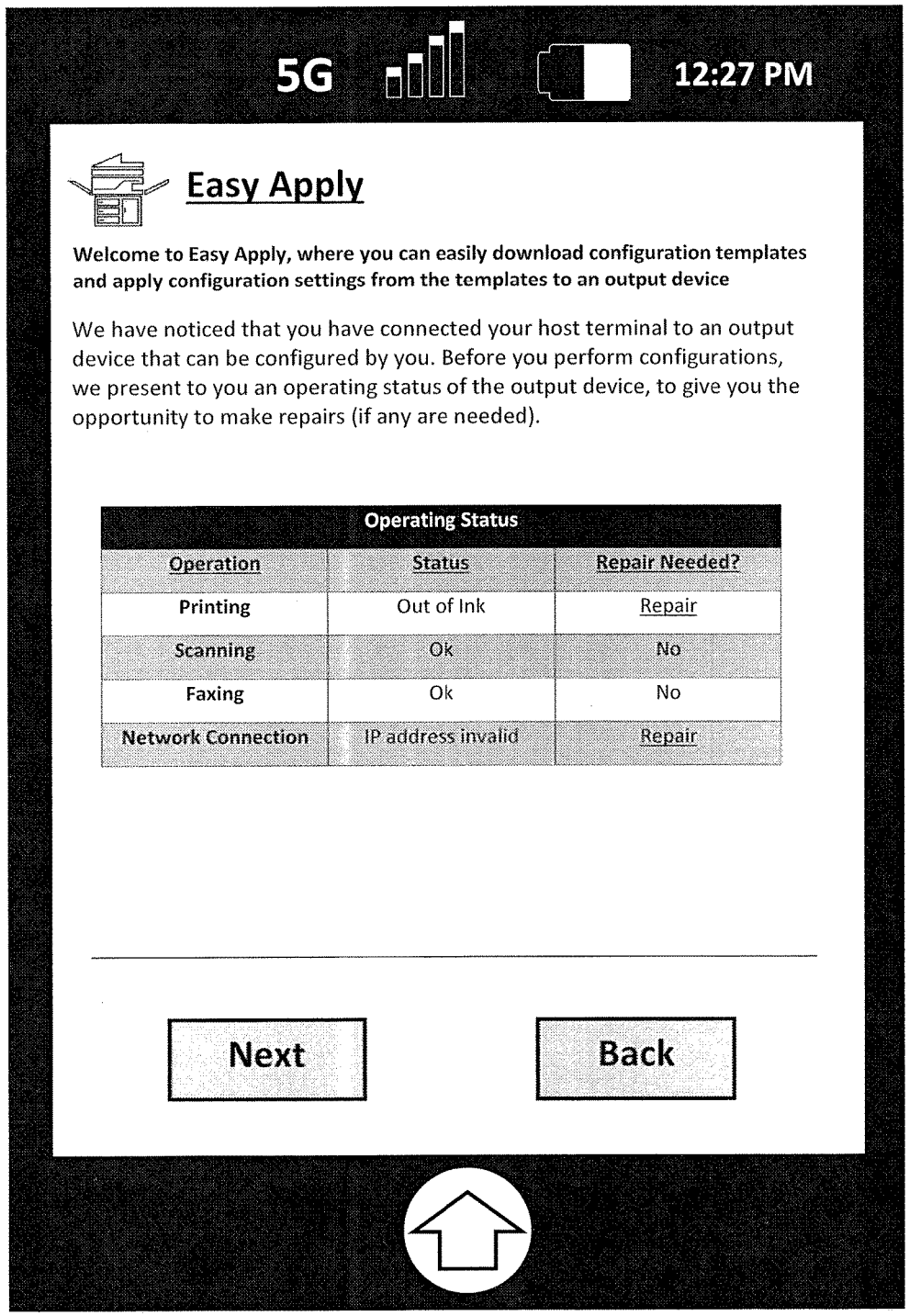
FIGS. 9A-9G show examples of user interface screens that can be provided by a technician configurator application or another mobile application, in any of the systems of FIGS. 1A-1C (or an equivalent)

Next, after point-to-point communication has been established between the host terminal and the output device, the technician configurator application may obtain and display to the user an operating status of the output device along with repair options (step S802). The operating status may be the current condition of the output device. For example, the output device may be operating normally with no problems. In another example, the output device may have some issues (e.g., paper jam, out of ink, network connectivity problems, etc.). Nevertheless, the technician user is shown such operating status whether or not there are any issues, such as shown in FIG. 9A. In the example illustrated by FIG. 9A, the output device currently has two issues. The output device cannot print because there is no ink left and there are network connectivity problems in the form of an invalid IP address.

Thus, in the case that the output device is in need of repairs (step 803, yes), the technician configurator application records current settings corresponding to the output device in a device record that is stored locally on the host terminal (step S804). The technician configurator application performs the recordation (e.g., snapshot) of the current settings before the repairs are performed, so that if anything goes wrong during the repair process, the technician configurator application can apply the snapshot of the current settings to restore the output device to a previous state. Next, the technician configurator application causes the output device to perform the repair actions to fix any issues in the output device (step S805). The technician user does not need to log in or use the output device directly to perform repairs, and may instead perform such repairs from the technician configurator application.

Figure 9B:
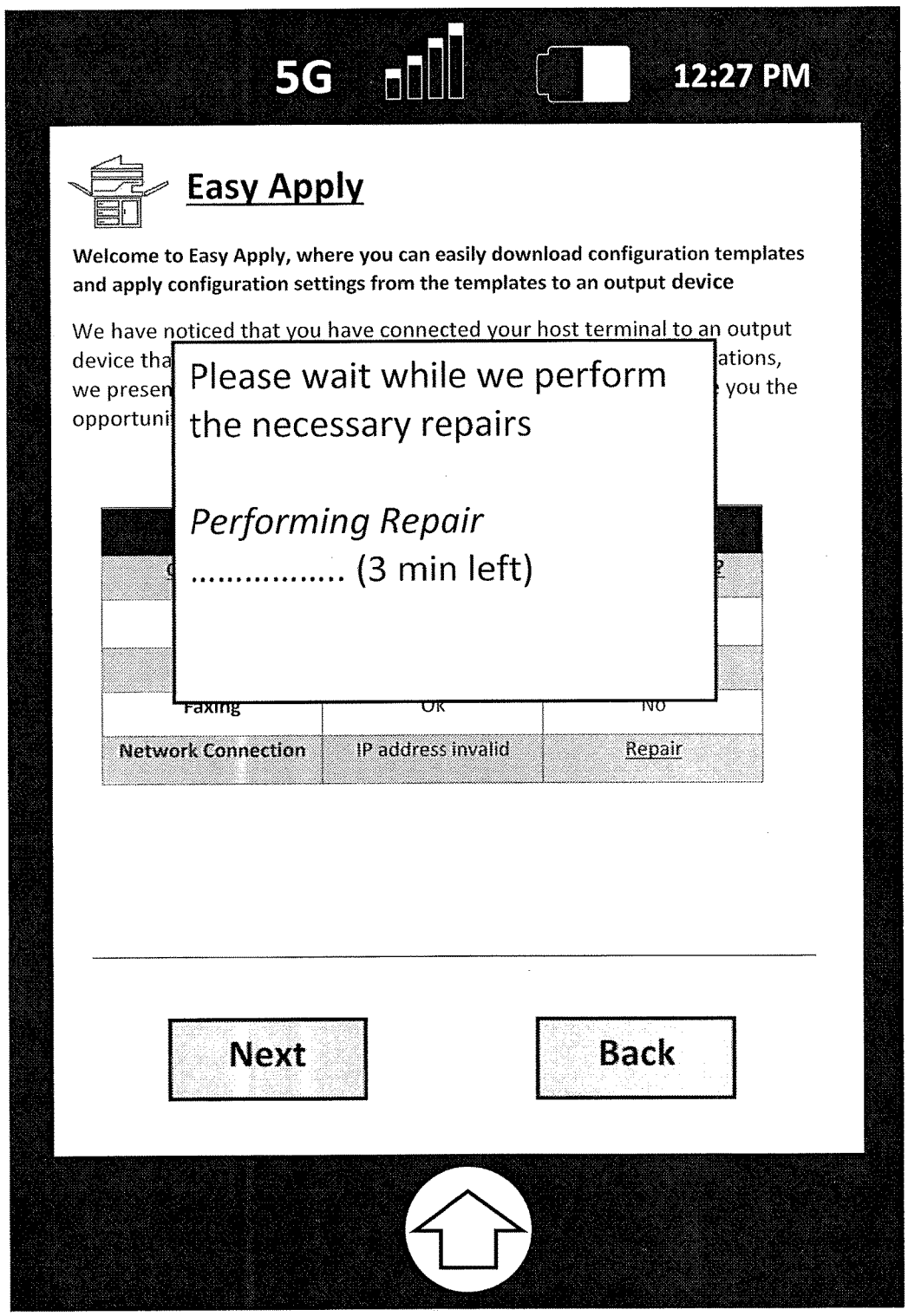
Figure 9C:
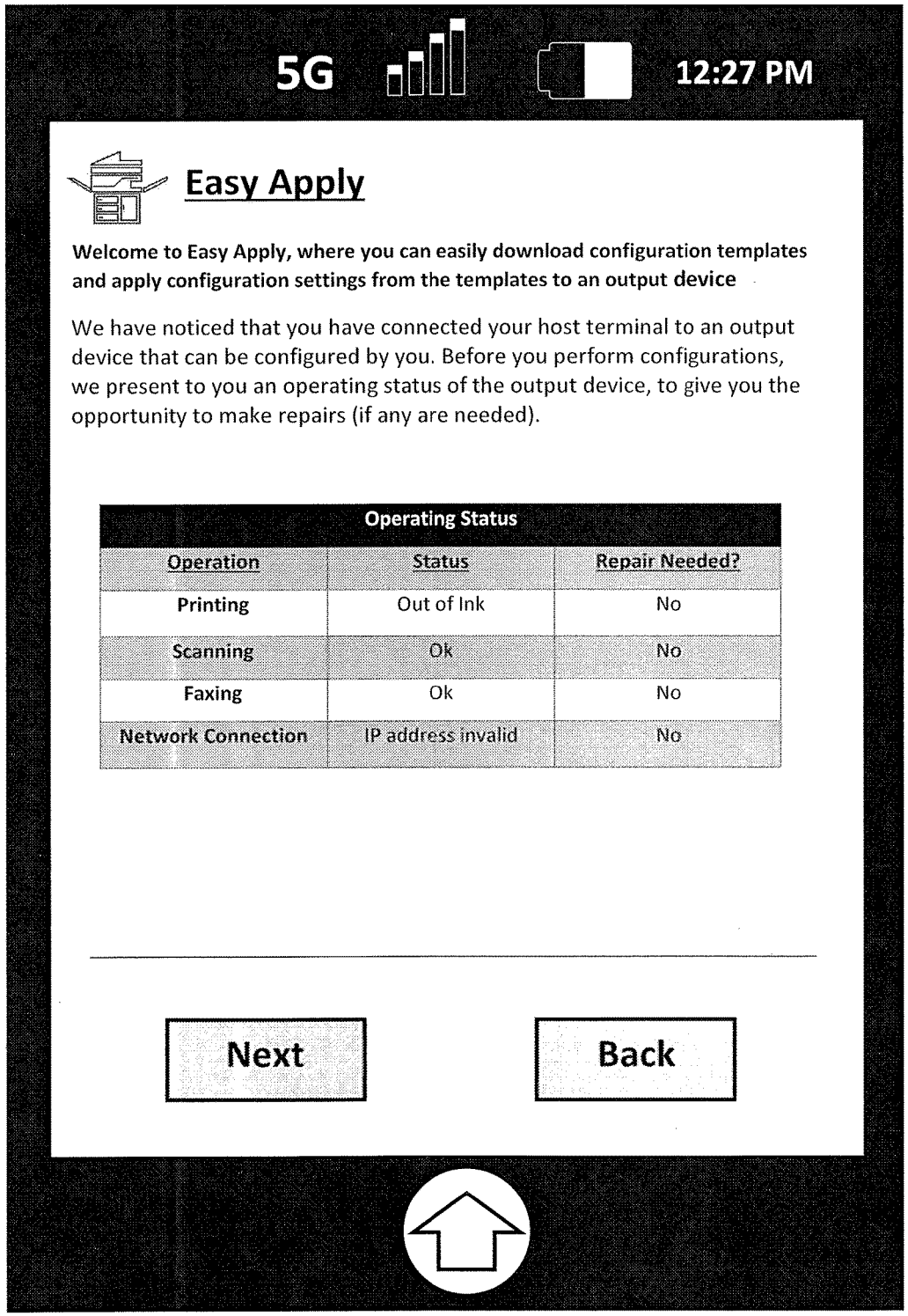
Figure 9D:
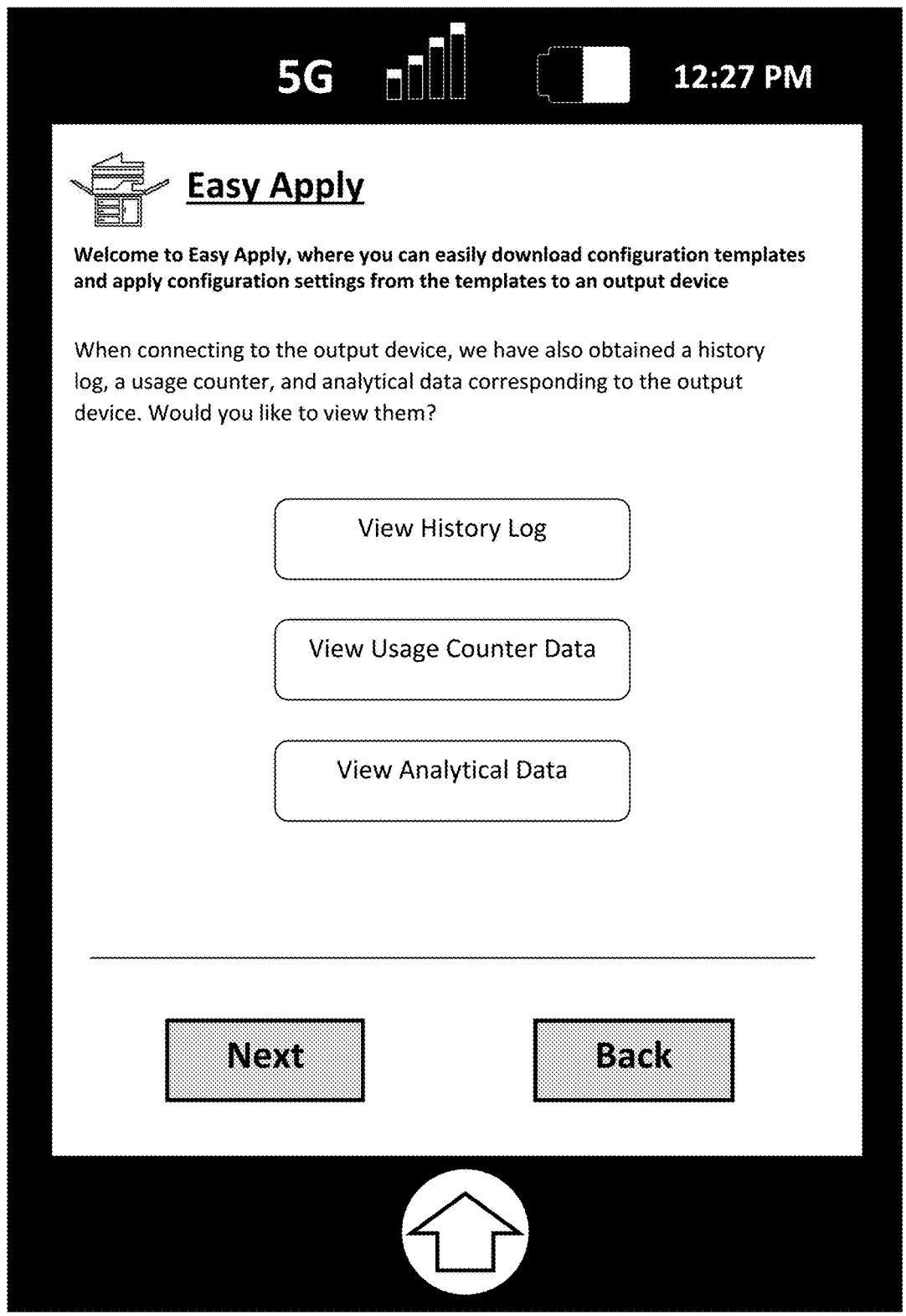

The user may elect to repair such issues by activating the "repair" button on the "Operating Status" table, to cause the output device to perform repairs, such as shown in FIG. 9B. After such repairs are finished, the operating status after the repair actions are performed are displayed to the user, such as shown in FIG. 9C. Next, the technician configurator application records in the device record, the current operating status after the repair actions are performed and information regarding any of the repair actions made in association with the operating status before the repair actions were applied (step S806). In addition, the technician configurator application also obtains (and records in the device record) history log, usage counter data, and analytical data corresponding to the output device. Otherwise (step S803, no), the technician configurator application skips the steps for repairing the output device and moves onto the next step. The technician user may view each of the history log, usage counter data, and analytical data, such as shown in FIG. 9D.

Figure 9E:
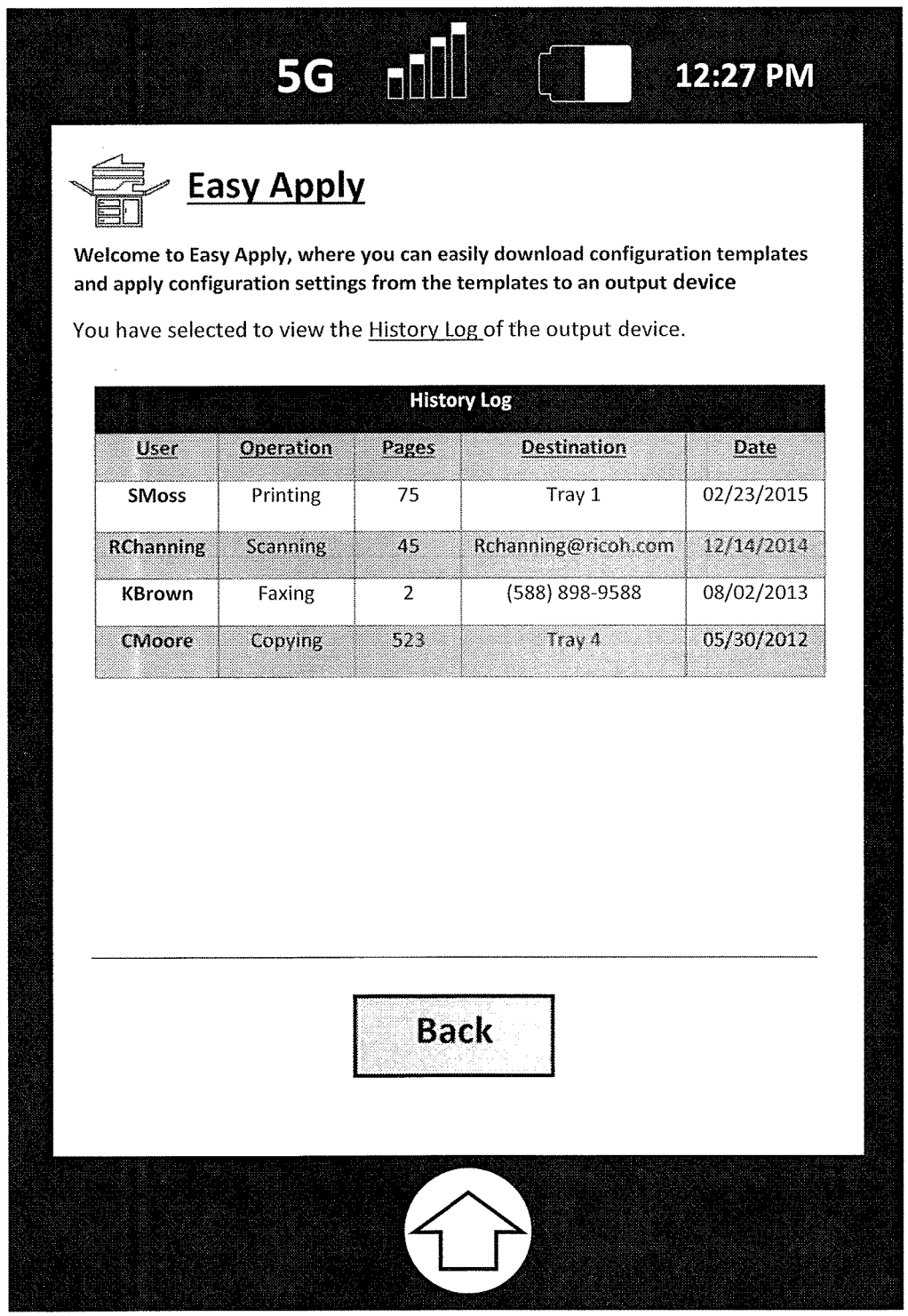
Figure 9F:
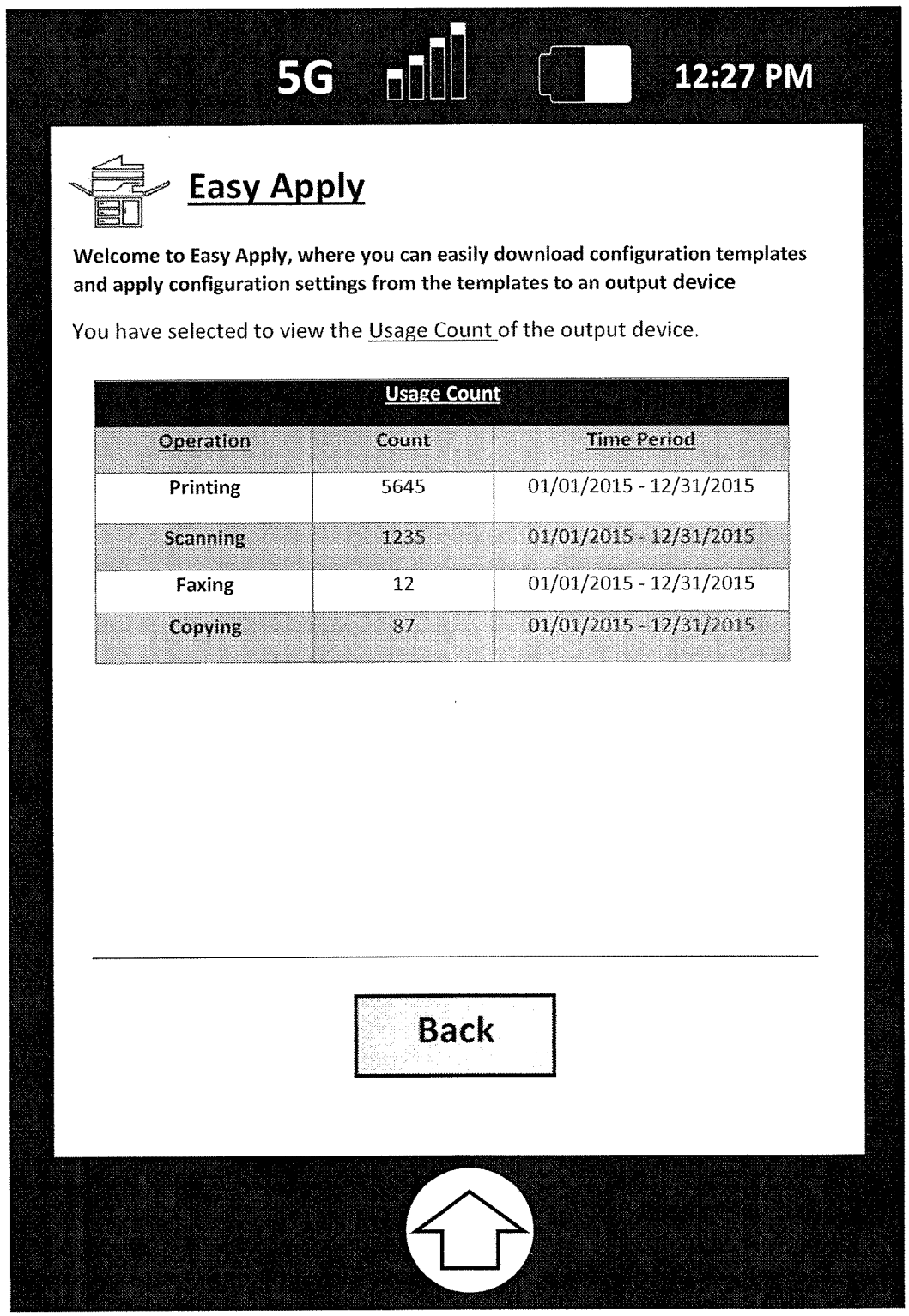
Figure 9G:
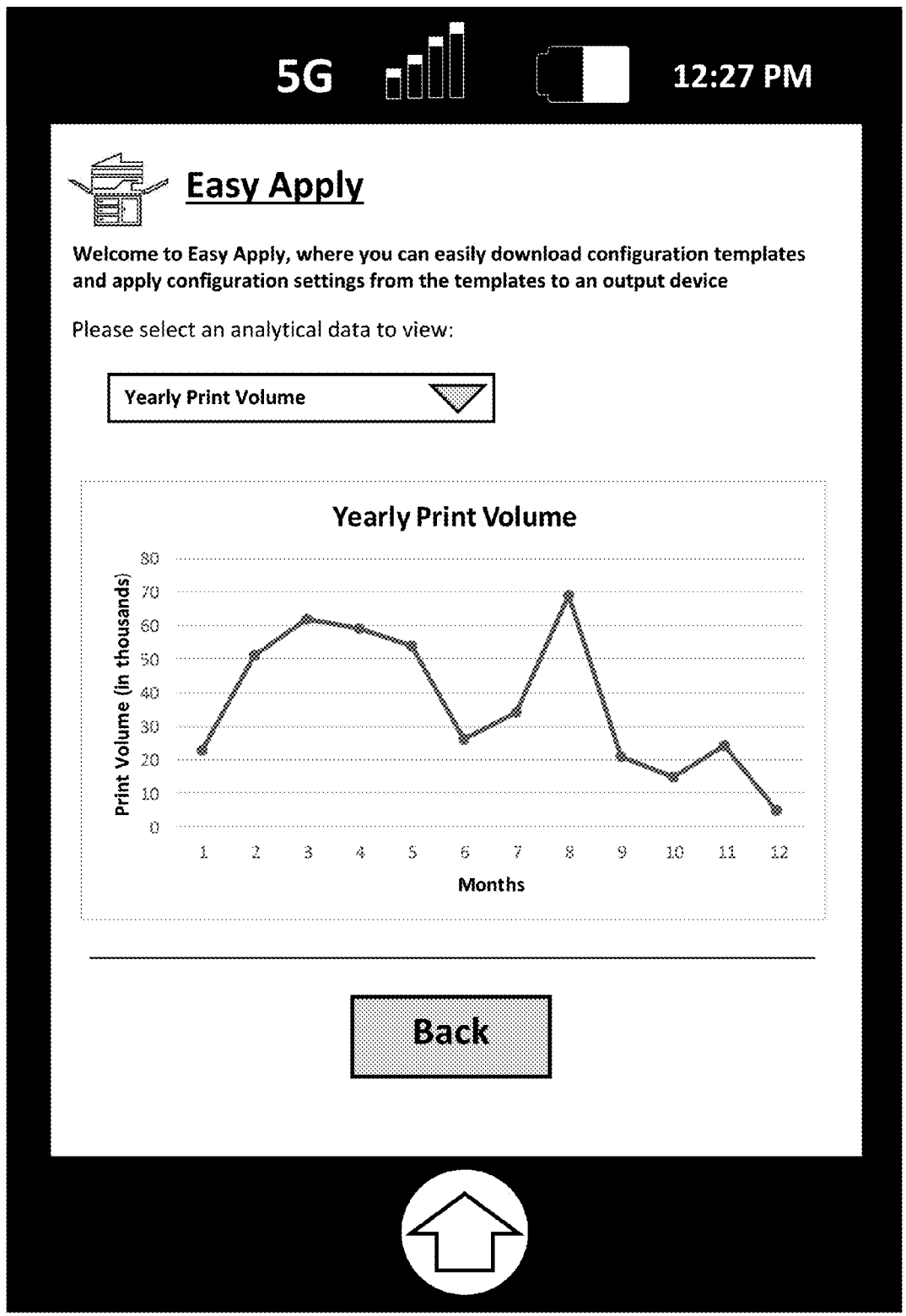

Thus, when the technician user activates the "View History Log" button, the technician configurator application displays the history log of the output device, such as shown in FIG. 9E. Here, the user may view operations made by various users at certain dates. On the other hand, when the technician user activates the "View Usage Counter Data" button, the technician configurator application displays the usage counter data, such as shown in FIG. 9F. Here the user may view how many times an operation (e.g., printing, scanning, copying, faxing, etc.) was performed on the output device over a predetermined time period. When the technician user activates the "View Analytical Data" button, the technician configurator application displays the analytical data, such as shown in FIG. 9G. Here, the technician user may view data in the output device that may be compiled into graphs, charts or tables. As shown, the user may select different types of analytical data to view.

Next, after obtaining and recording the history log history log, usage counter data, and analytical data, into the device record, the technician configurator application retrieves current configuration settings of the output device and validates the retrieved current configuration settings of the output device against configuration templates configured for the output device (step S808). Then, the technician configurator application stores locally on the host terminal a validation record that comprises (i) a timestamp of when the validation was performed, (ii) results of the validation and (iii) configuration templates employed in the validation (step S809). Thereafter, at any point in time in which the technician configurator application is connected to the device management server, the technician configurator application automatically uploads to the device management server the device record and the validation record stored locally on the host terminal (step S810).

Figure 10:
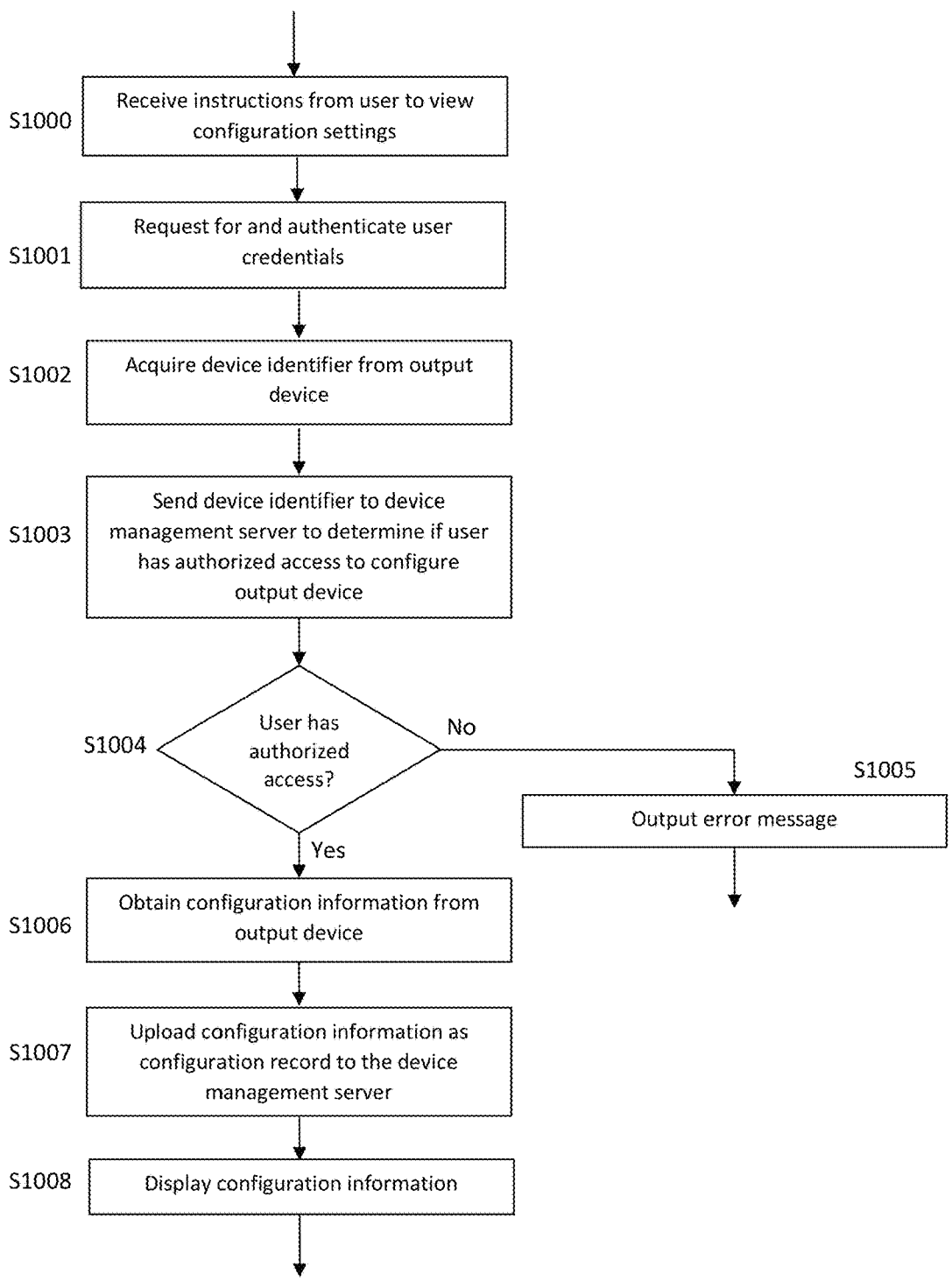
FIG. 10 shows a flow chart of a method that can be performed in any of the systems of FIGS. 1A-1C (or an equivalent)

FIG. 10 shows a method that can be performed by or with a technician configurator application (e.g., 101a) on a host terminal (e.g., 101).

Figure 11A:
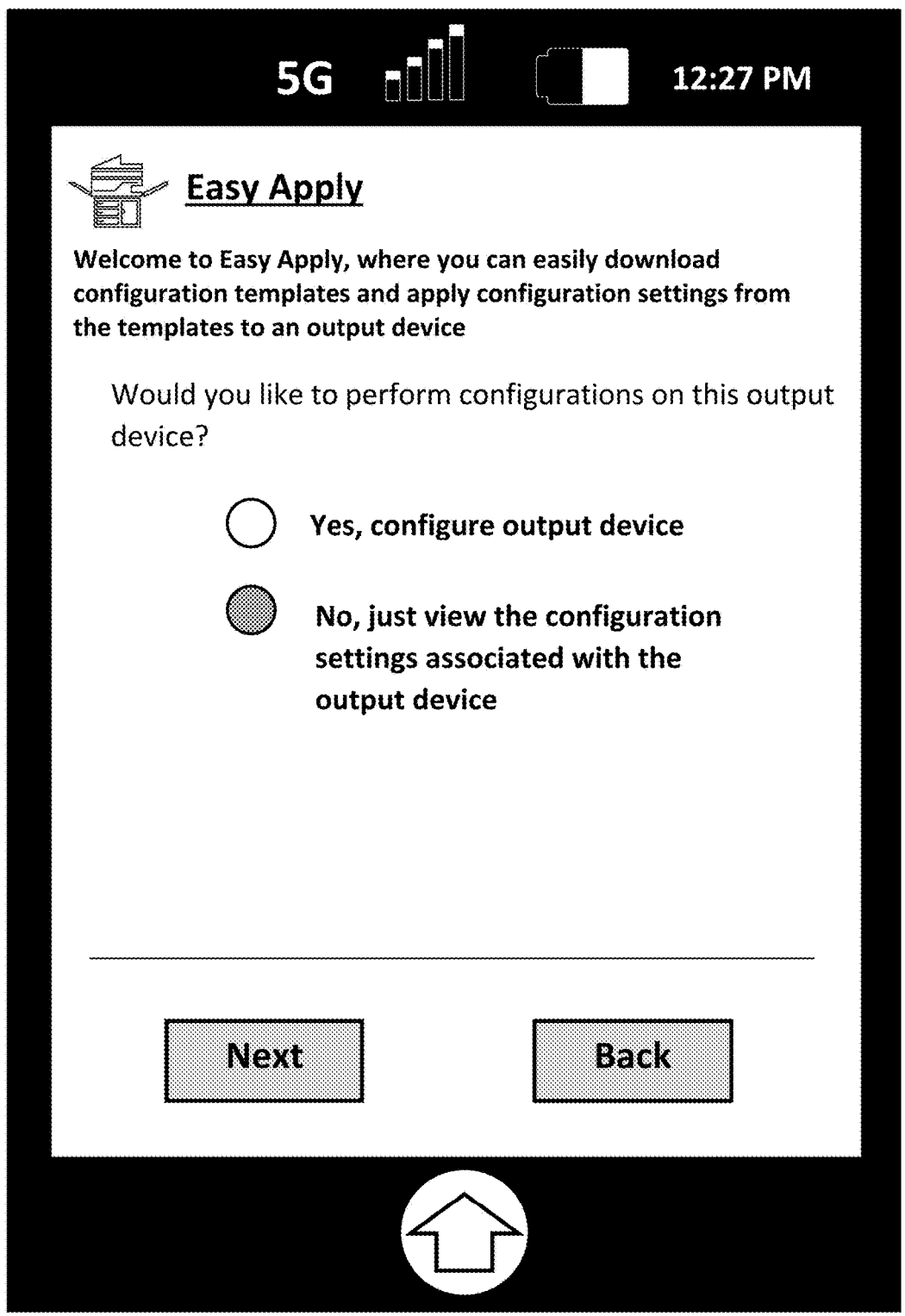
FIGS. 11A-11C show examples of user interface screens that can be provided by a technician configurator application or another mobile application, in any of the systems of FIGS. 1A-1C (or an equivalent)

The technician user may wish to view present configuration settings (or present configuration information) of the output device before determining whether or not he or she wishes to configure the output device. The present configuration information (e.g., properties, device/system settings, status, etc.) of the output device may be information that currently describes the output device. The configuration information of the output device can correspond to the configuration templates previously downloaded, in terms of category and structure. The technician configurator application may receive instructions from the technician user to view configuration settings corresponding to the output device when the technician user clicks on the corresponding radio button and activates the "Next" button (step S1000), such as shown in FIG. 11A.

Figure 11B:
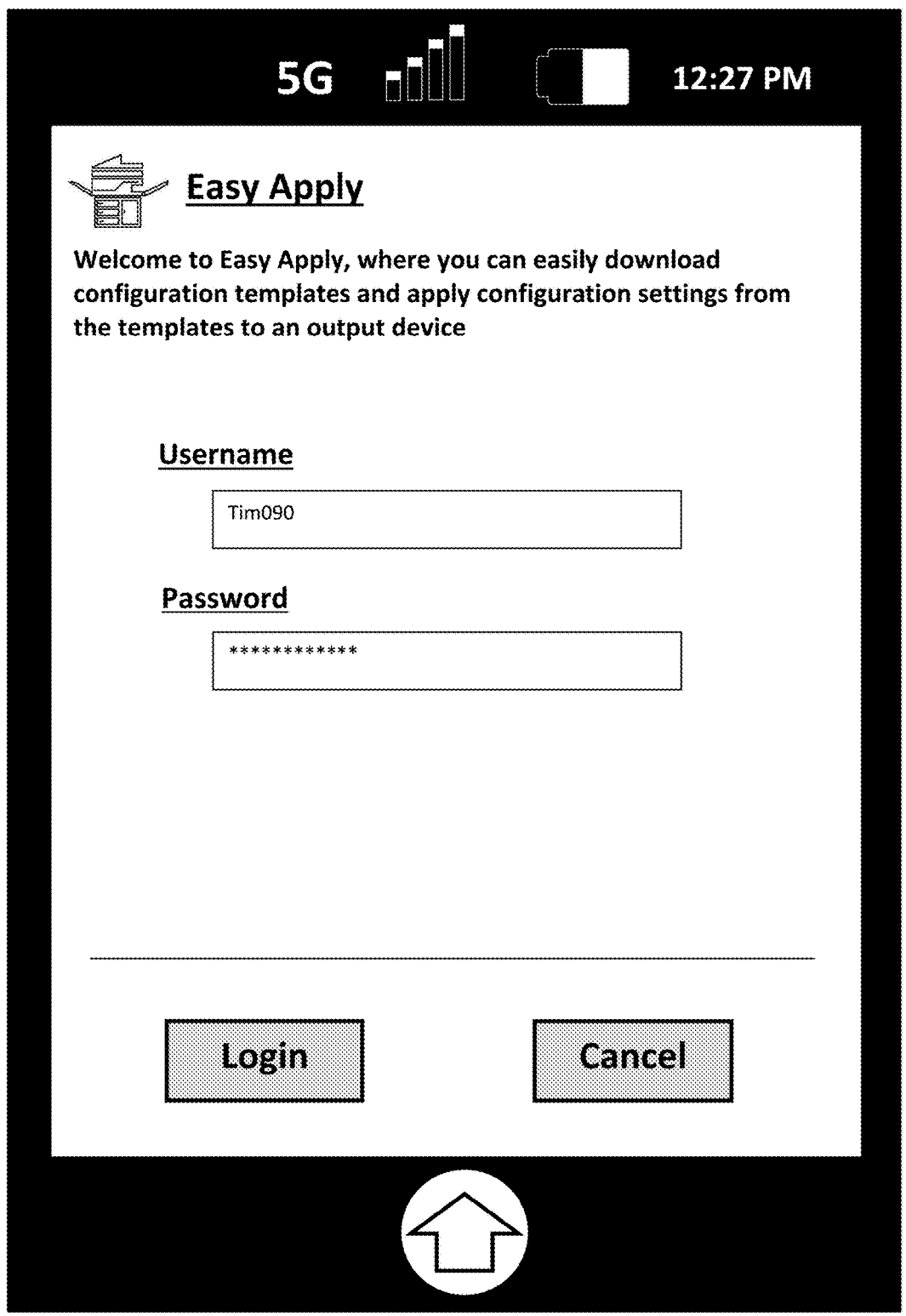

After receiving such instructions, the technician configurator application may request the technician user to enter his or her credentials again for added security (step S1001), such as shown in FIG. 11B. This is because, the technician configurator application may want to confirm that the technician user has permission to access and view the configuration information corresponding to the output device. After authenticating the user credentials, the technician configurator application may request a device identifier associated with the output device. Such device identifier may be a series of letters, numbers and/or characters (e.g., 34HLE, 944JK, etc.) that are unique to each output device in the organization. A particular output device can be identified by its associated device identifier.

After receiving the device identifier from the output device (S1002), the technician configurator application may send (or forward) such device identifier to the device management server in order to determine whether the technician user has permission to configure the output device (S1003). In the case that the technician user does not have authority to access the output device (S1004, no), the technician configurator application informs the user accordingly (S1005). Otherwise, in the case that the technician user is allowed to configure the output device (S1004, yes), the technician configurator application causes the host terminal to perform point-to-point communication once again to retrieve present configuration information from the output device (S1006).

Figure 11C:
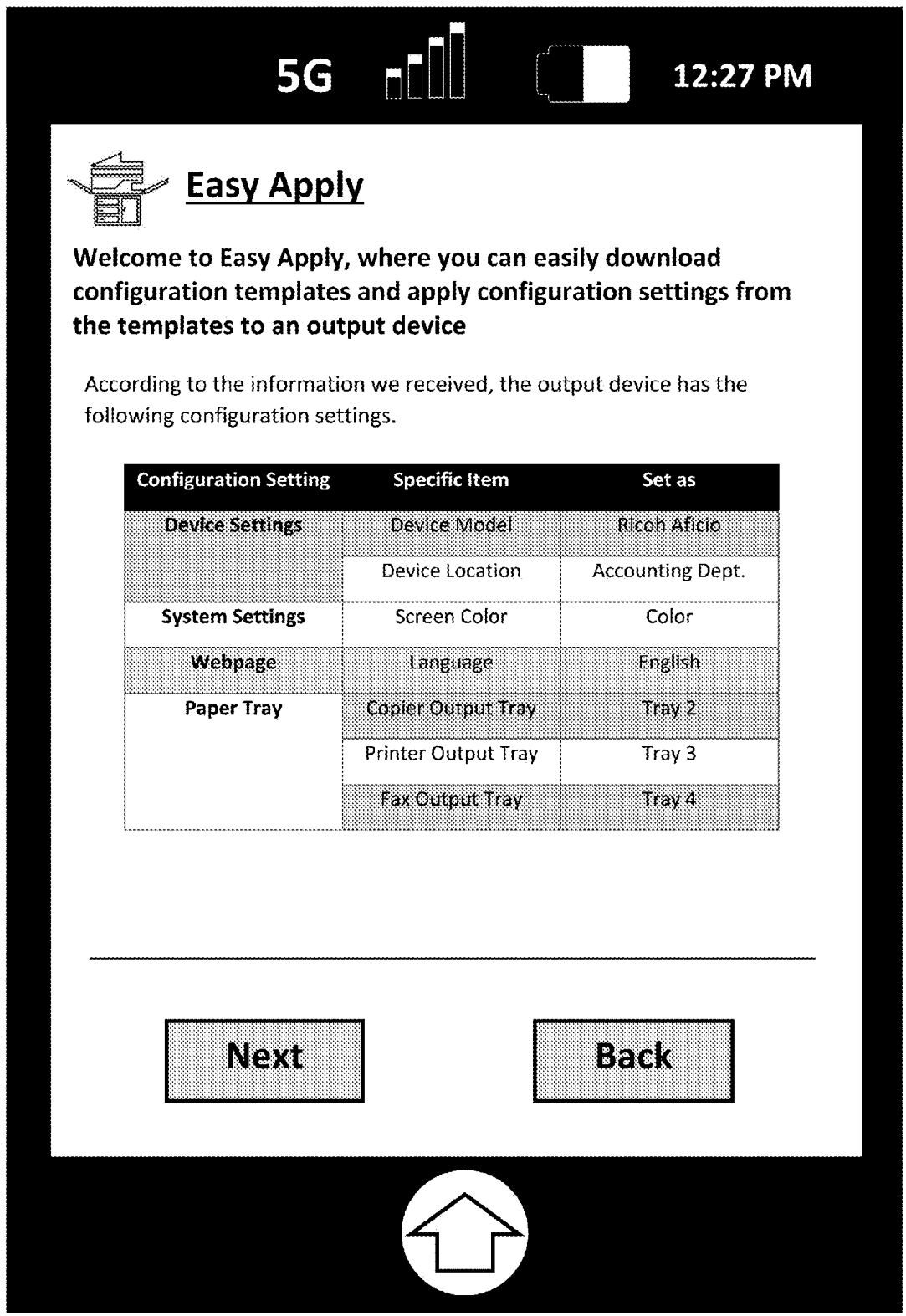

Next, the technician configurator application uploads the configuration information to the device management server (step S1007). Then, the technician configurator application displays such configuration information to the technician user (step S1008), such as illustrated in FIG. 11C. As shown, the configuration information may be very similar in style and format to the configuration templates. However, this may not always be true. The configuration information may be presented in numerous styles and various formats for the technician user to view.

Figure 12:
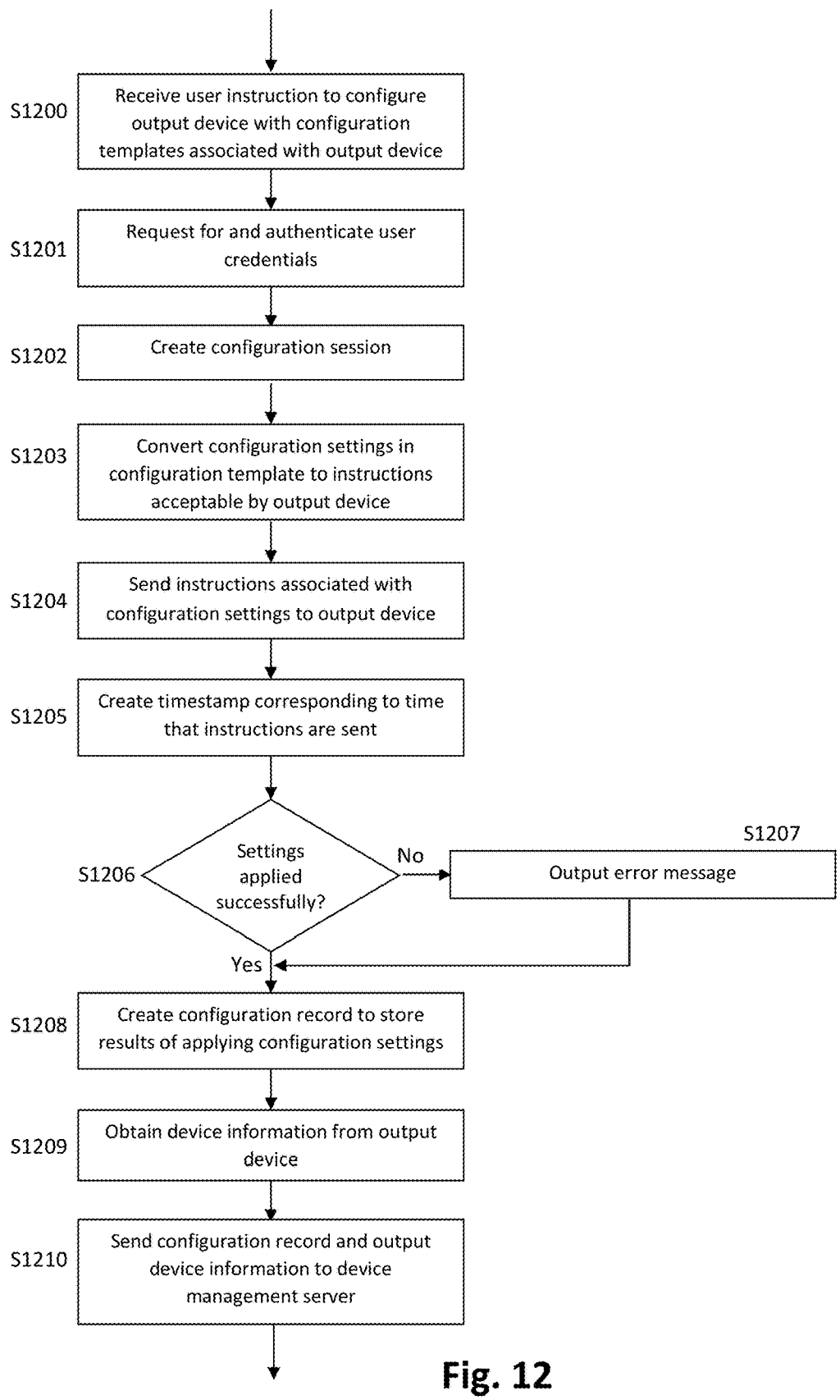
FIG. 12 shows a flow chart of a method that can be performed in any of the systems of FIGS. 1A-1C (or an equivalent)

FIG. 12 shows a method that can be performed by or with a technician configurator application (e.g., 101a) on a host terminal (e.g., 101).

Figure 13A:
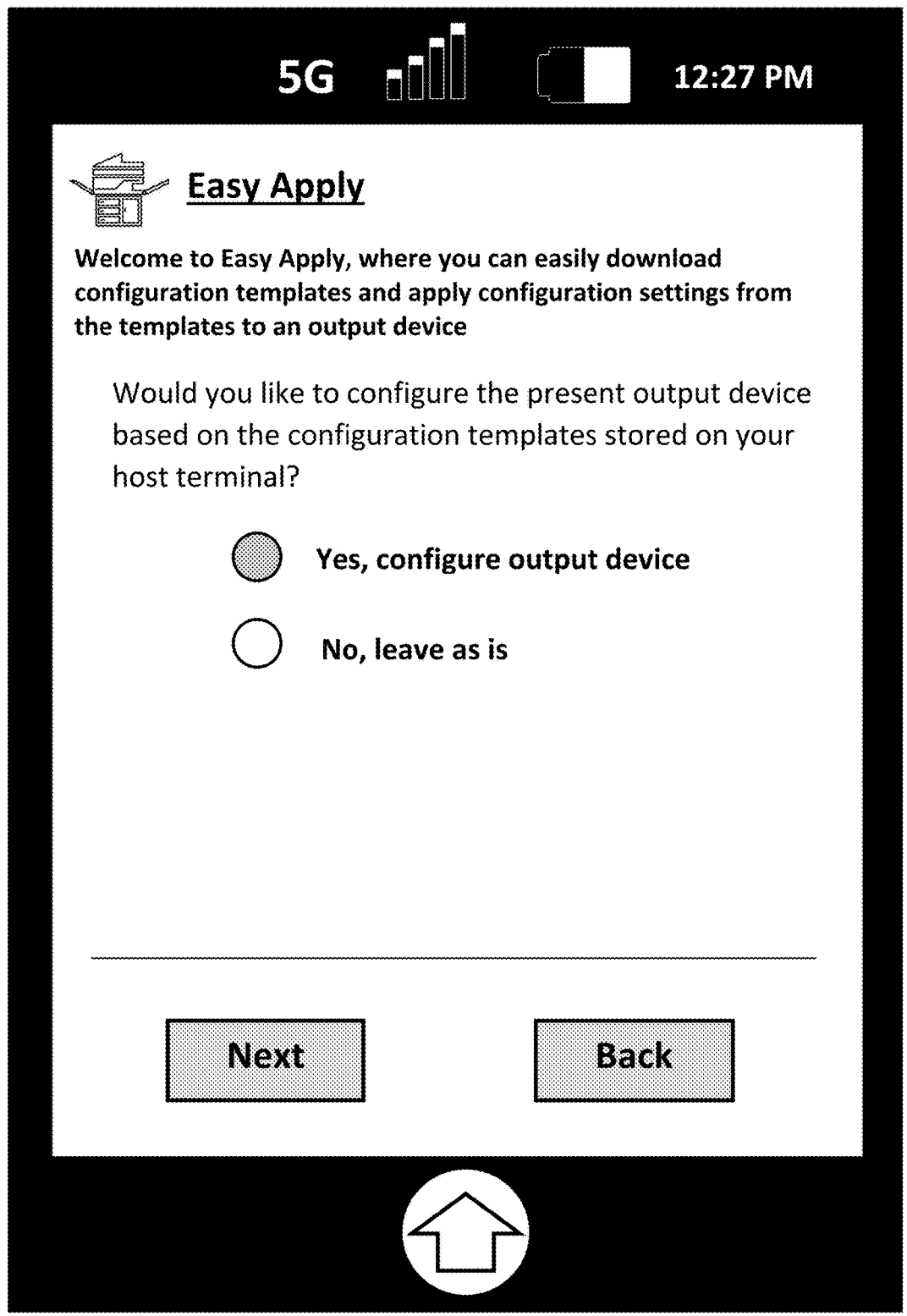
FIGS. 13A-13C show examples of user interface screens that can be provided by a technician configurator application or another mobile application, in any of the systems of FIGS. 1A-1C (or an equivalent)

After viewing the configuration information, the technician user may determine that the configuration information in the output device is different from the configuration templates. In the case that the technician user received orders to configure the output device with the downloaded configuration templates regardless of whether the configuration information reflects the configuration templates, when the technician user is asked by the technician configurator application whether the user would like to configure the output device, the technician user selects the radio button corresponding to "Yes, configure output device" and activates the "Next" button accordingly, such as shown in FIG. 13A.

Figure 13B:
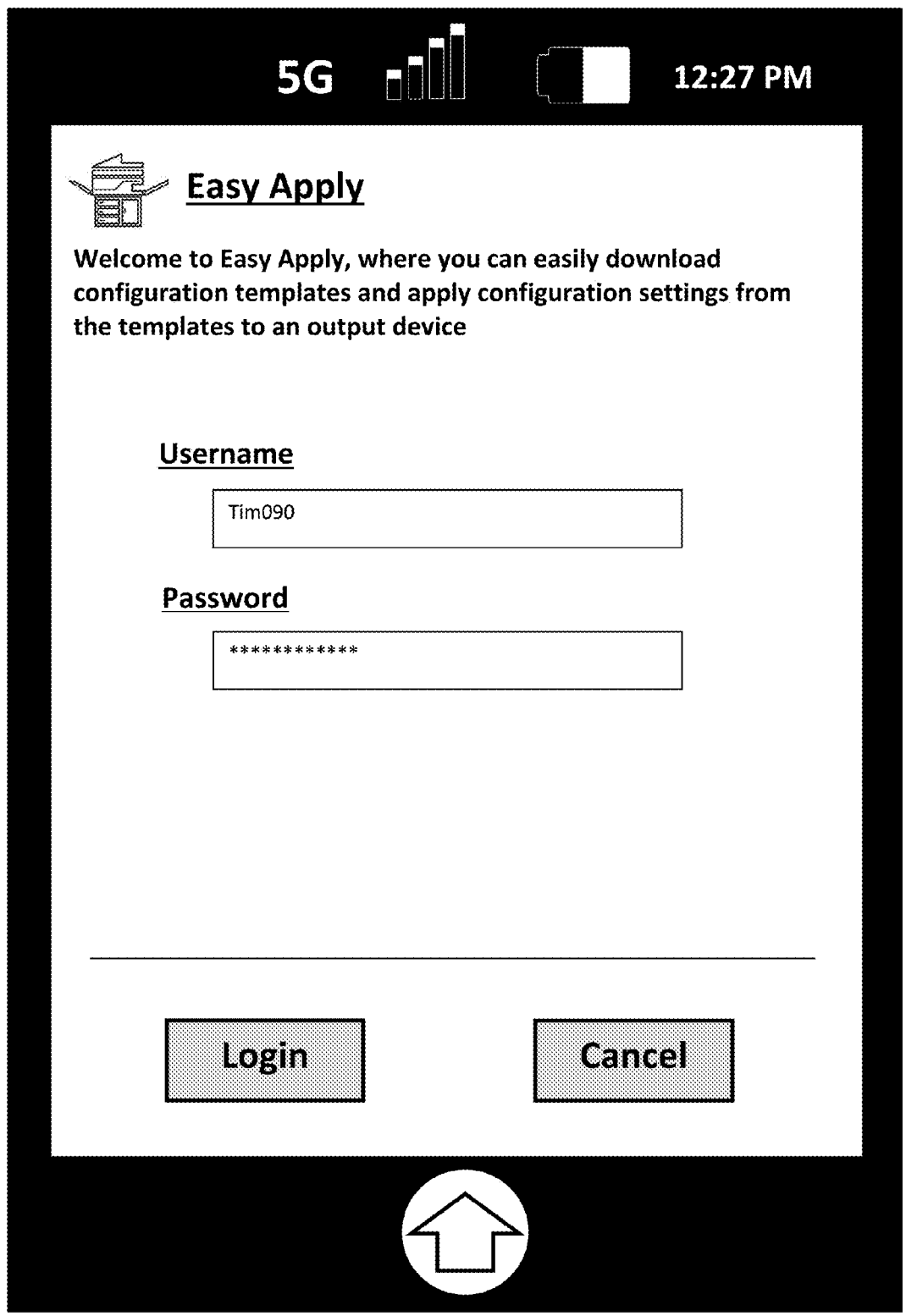

After receiving command(s) from the technician user to configure the output device using the configuration templates that are (i) stored on the host terminal and (ii) associated with the output device (S1200), the technician configurator application requests user credentials from the technician user for authentication for added security purposes (step S1201), such as shown in FIG. 13B. Next, after authenticating the technician user, the technician configurator application creates a configuration session (step S1202). Such configuration session includes a timestamp associated with the configuration session and configuration results (including any failures during the configuration process).

Next, the technician configurator application converts configuration settings in the configuration templates into a format that is readable (or acceptable) by the output device (S1203). As discussed supra, the configuration template may be for various output devices. Such output devices may be of different model or device type. Thus, the technician configurator application may modify (or adapt) the configuration settings in the configuration template into a language (or format) that can be readable by any of the output devices associated with the configuration templates.

After performing the conversion of the configuration settings, the technician configurator application sends the converted configuration settings as converted instructions to the output device (S1204). Immediately after sending the converted instructions, the technician configurator application creates a timestamp corresponding to the exact time that the converted instructions was sent (step S1205). The technician configurator application may access an internal clock or application on the host terminal to obtain the timestamp. Next, the technician configurator application may determine whether the settings were applied to the output device successfully (S1206). In the case that the settings were not applied successfully (S1206, no), the technician configurator application displays an error message to the technician user (S1207).

Figure 13C:
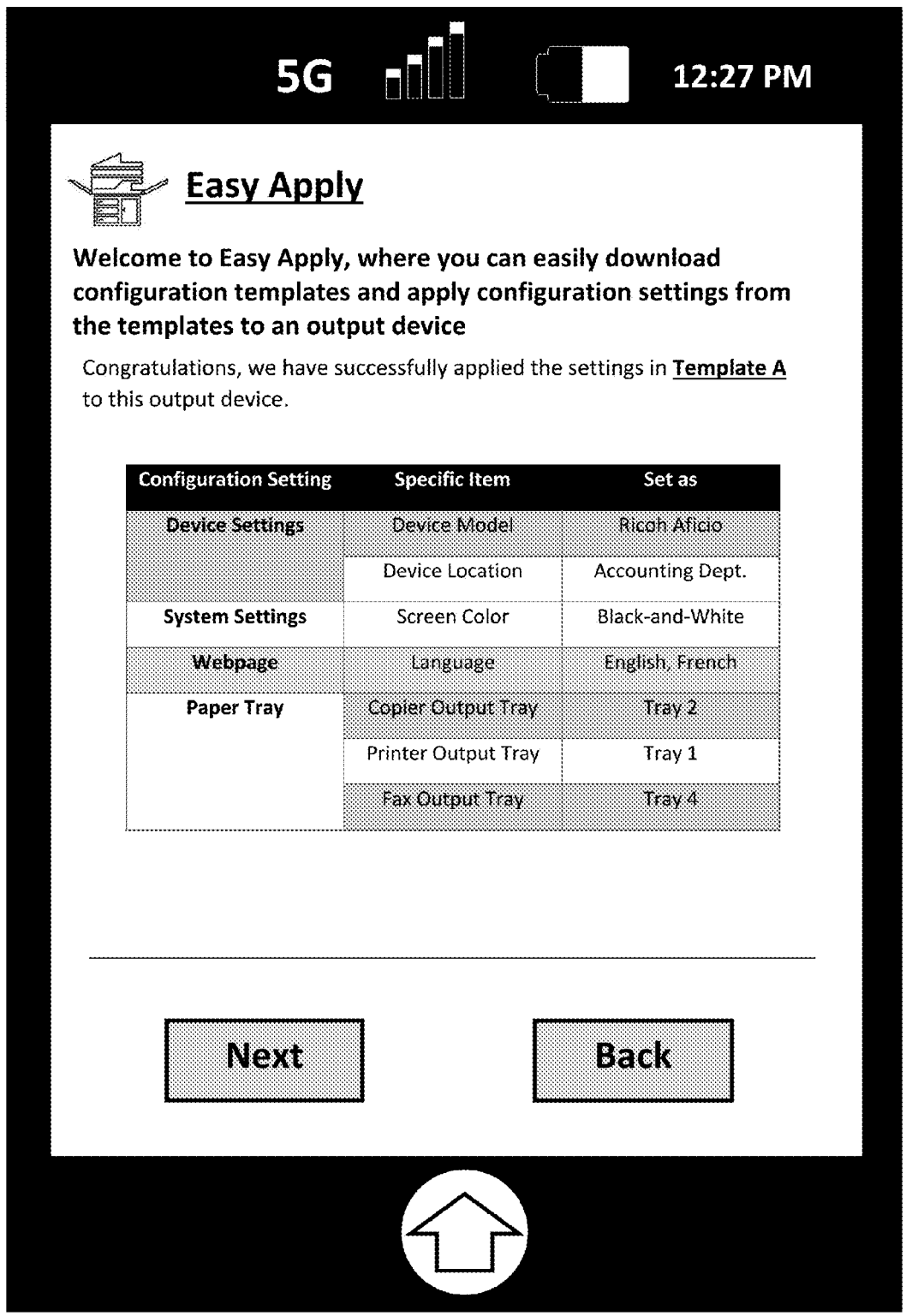

On the other hand, in the case that the configuration settings have been applied successfully (S1206, yes), such as shown in FIG. 13C, the technician configurator application creates a configuration record to store the results of the attempt to apply configuration settings to the output device (S1208). If the application of the configuration settings to the output device is successful, the technician configurator application stores such result in the configuration record. Likewise, even if the application of the configuration settings is not successful, the technician configurator application stores a record that the application of the configuration settings failed or was unsuccessful, in the configuration record. In addition, the technician configurator application also stores the timestamp into the configuration record. After storing the configuration record, the technician configurator application communicates with the output device via point-to-point communication in order to obtain device information (e.g., operating status, historical data, usage counter data, analytical data, etc.) from the output device (S1209). Next, the technician configurator application performs communication with the device management server and sends, upon validation by the device management server, (i) the configuration record and (ii) the device information (S1210).

Figure 14:
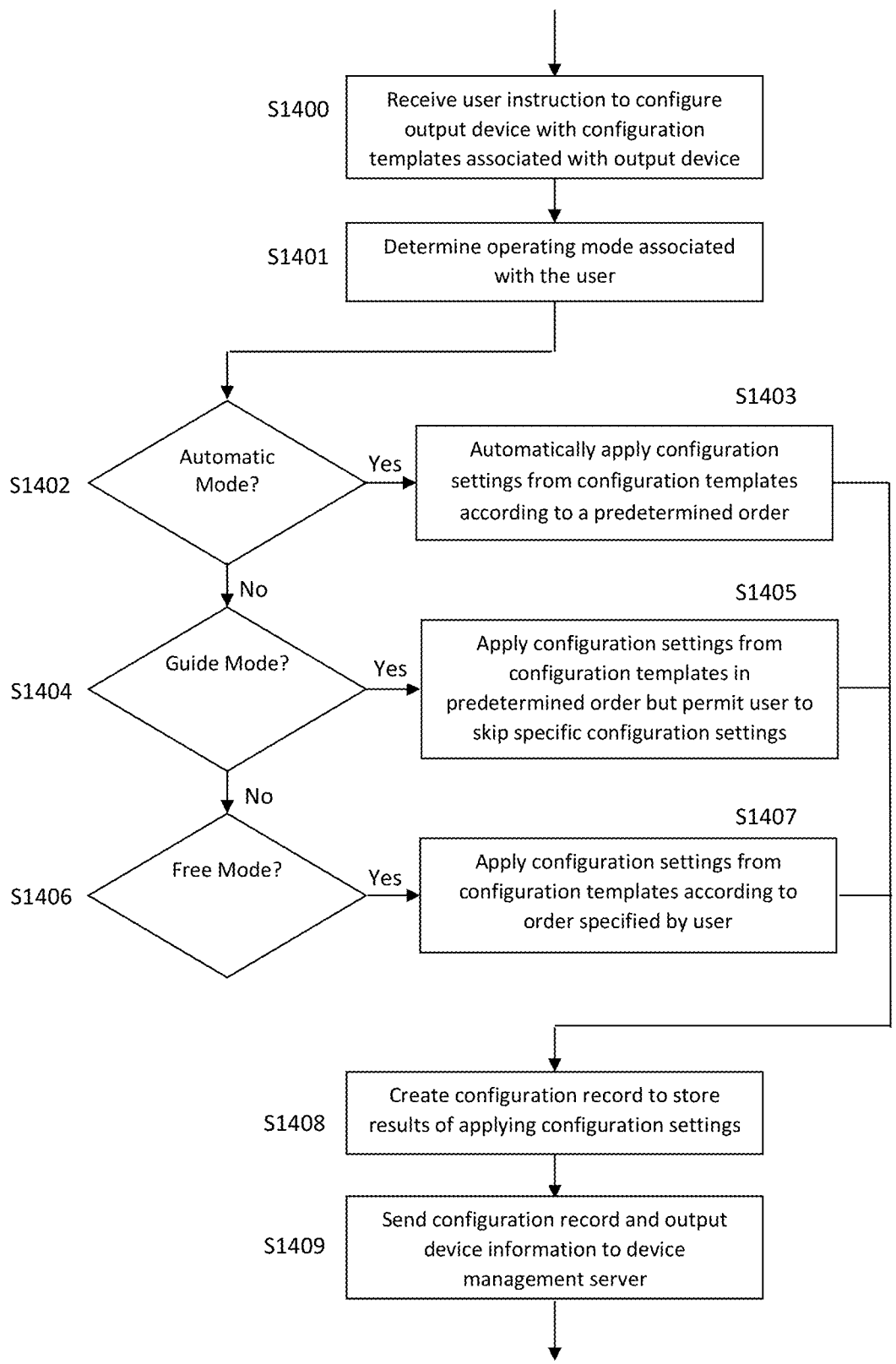
FIG. 14 shows a flow chart of a method that can be performed in any of the systems of FIGS. 1A-1C (or an equivalent)

FIG. 14 shows a method that can be performed by or with a technician configurator application (e.g., 101a) on a host terminal (e.g., 101).

After receiving instructions from the technician user to configure the output device using the configuration templates that are (i) stored on the host terminal and (ii) associated with the output device (S1400), the technician configurator application determines the operating mode (e.g., automatic, guided, free) associated with the technician user (S1401). Not all users of the technician configurator application can perform the same operations on an output device. Some users have special privileges that allow them to perform more specific actions.

Figure 15A:
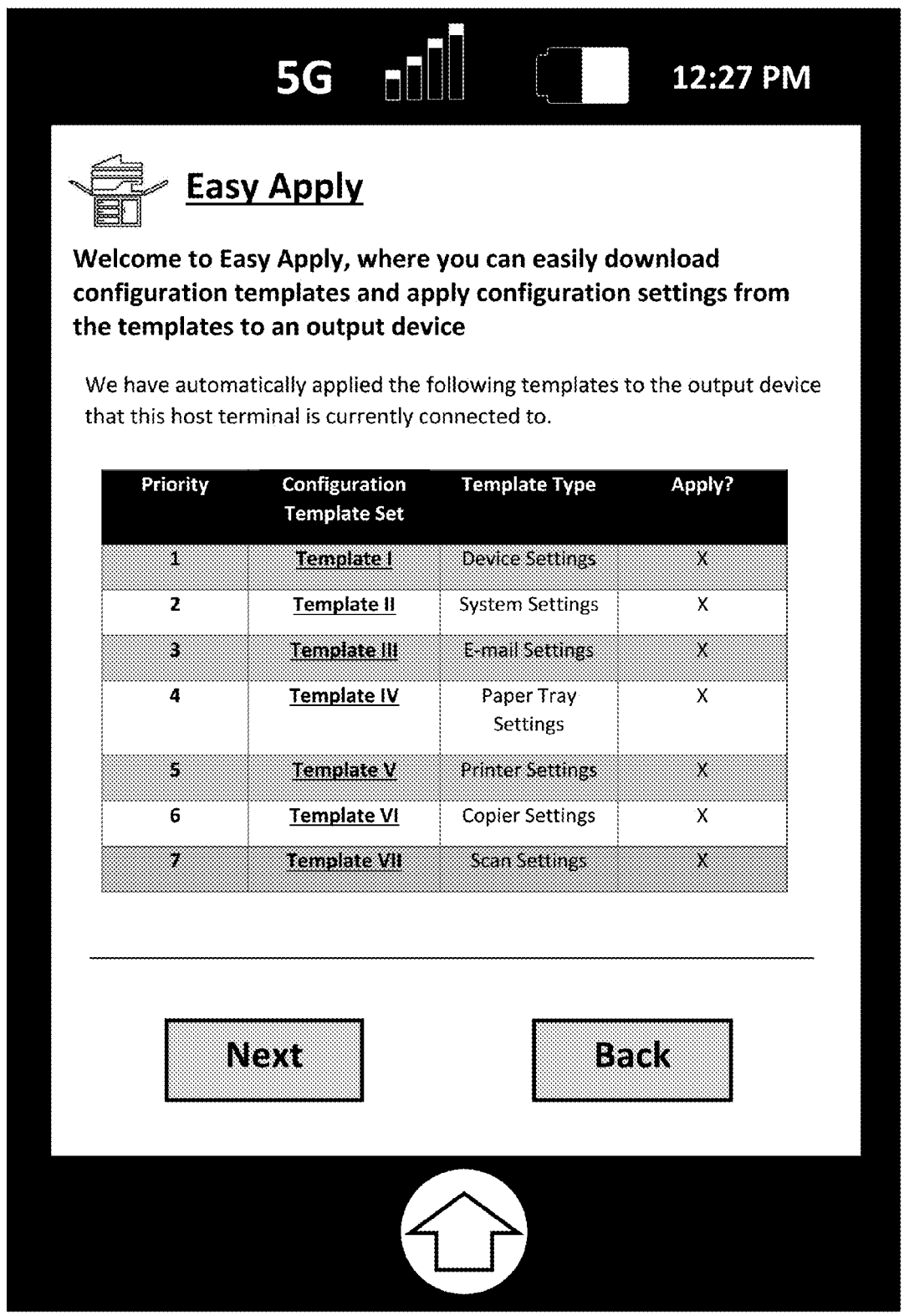
FIGS. 15A-15C show examples of user interface screens that can be provided by a technician configurator application or another mobile application, in any of the systems of FIGS. 1A-1C (or an equivalent)

In the case that the operation mode is automatic mode (S1402, yes), the technician configurator application applies the configuration templates stored on the host terminal in a predetermined order (S1403), such as shown in FIG. 15A. The configuration settings associated with each of the configuration templates are applied according to a certain procedure as indicated by the "Priority" category. Thus, when the technician configurator application begins to apply each of the configuration settings, the technician configurator application converts (into instructions readable by the output device) the configuration settings corresponding to the configuration template associated with priority "1" first. Further since this is automatic mode, every configuration setting associated with each configuration template is applied as indicated by the "Apply?" category, and the technician user cannot un-apply the "X's" from the "Apply?" category.

Figure 15B:
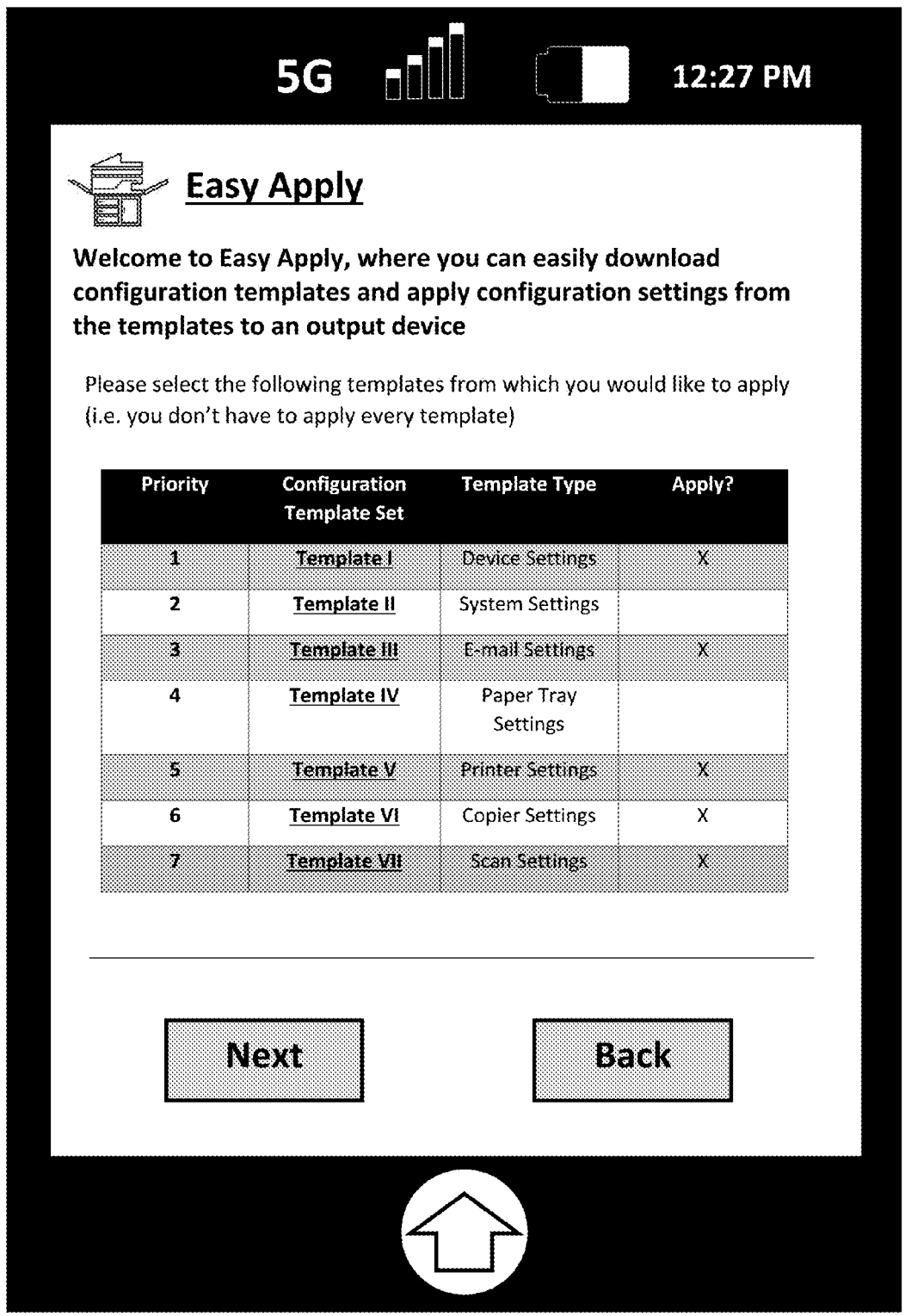

On the other hand, in the case that the operation mode is not automatic mode (S1402, no), the technician configurator application determines whether the operating mode is guided mode (S1404). In the case that the operating mode is guided mode (S1404, yes), the technician configurator application permits the technician user to skip applying one or more configuration templates (S1405), such as illustrated in FIG. 15B. In the example shown, the technician user has selected only to apply configuration settings from configuration templates I, III, V, VI and VII, while the technician user has not selected configuration templates II and IV. However, while the technician user is permitted to skip applying certain configuration settings associated with the configuration templates, he or she may still not be permitted to change the order of applying the configuration settings.

Figure 15C:
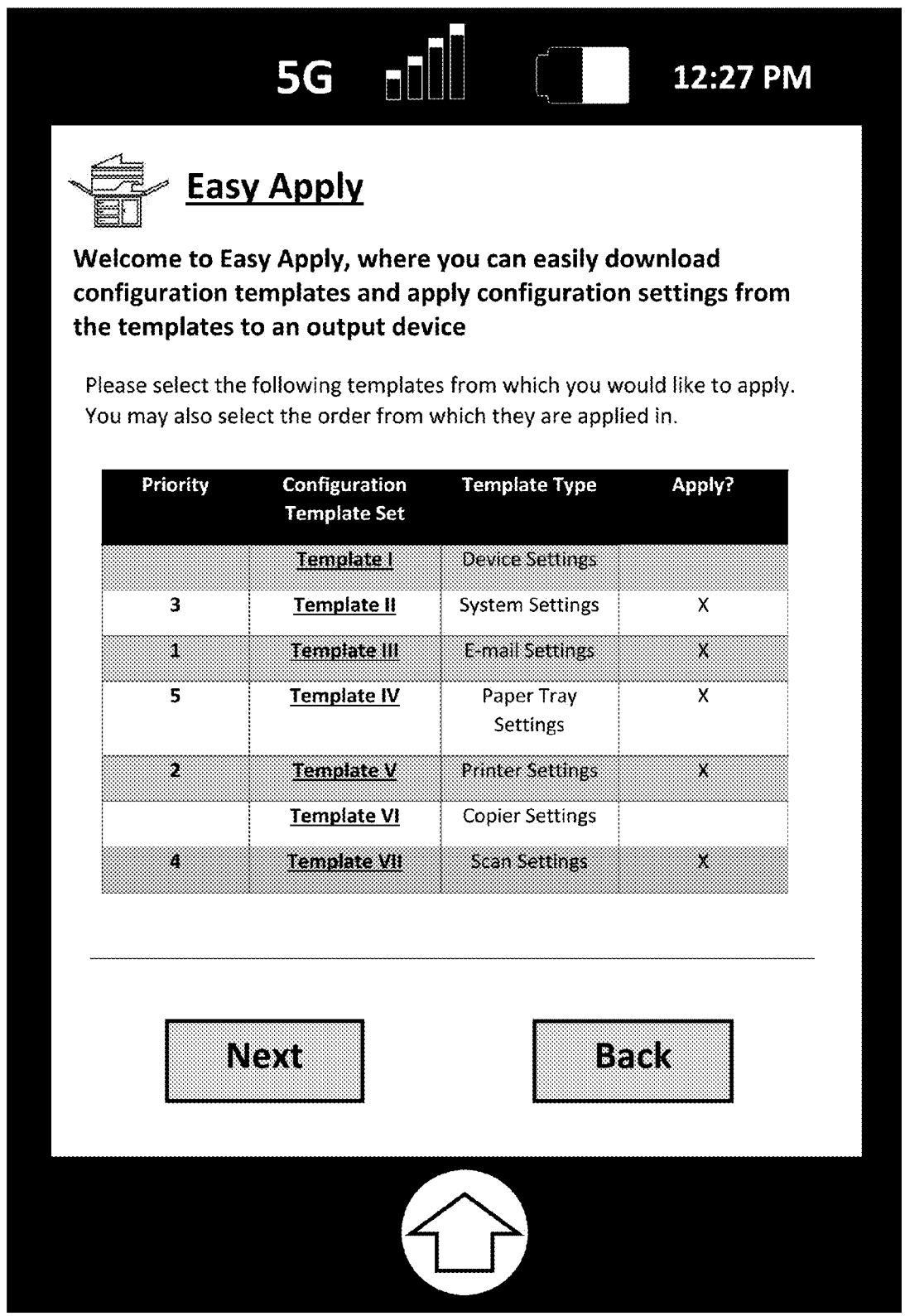

On the other hand, in the case that the operation mode is not guided mode (S1404, no), the technician configurator application determines whether the operating mode is free mode (S1406). In the case that the operating mode is free mode (S1406, yes), the technician configurator application permits the technician user to not only skip applying one or more configuration settings, but also change the order in which the configuration settings are applied (S1405), such as illustrated in FIG. 15C. As shown, the technician user has selected to not use templates I and VI. Further, the user has changed priority for each template (e.g., Template III is set as priority "1").

Once the configuration settings have been applied, the technician configurator application creates a configuration record to store the results of the attempt to apply configuration settings to the output device (S1408). Next, the technician configurator application performs communication with the device management server and sends, upon validation by the device management server, (i) the configuration record and (ii) output device information (S1409).

Figure 16:
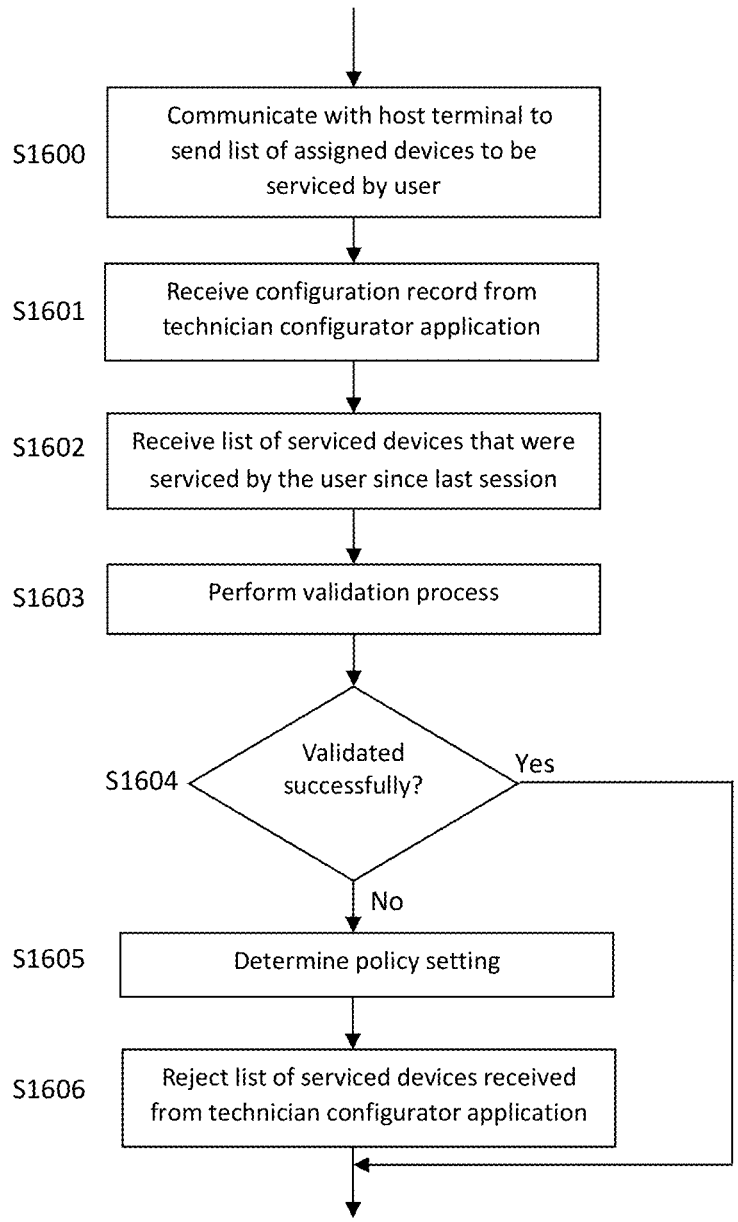
FIG. 16 shows a flow chart of a method that can be performed in any of the systems of FIGS. 1A-1C (or an equivalent)

FIG. 16 shows a method that can be performed by or with a device management server (e.g., 103).

When a device management server is connected to a host terminal (e.g., 101) that includes a technician configurator application (e.g., 101a), the device management server may send to the technician configurator application a list of assigned devices to be serviced by a technician user that is authenticated (step 1600). Next, the device management server may receive configuration records from the technician configurator application (step S1601). Further, the device management server may also receive a list of serviced devices that were serviced by the technician user since last session (step S1602). Such list includes one or more output devices that the technician user worked on since the last configuration session.

Next, the device management server performs a validation process (step S1603). The technician user may not have serviced only devices that he or she was assigned to. Instead, the technician user may have serviced other devices that he or she was not assigned to (or not authorized to service). To facilitate determining whether the technician user has serviced output devices that he or she was not authorized to perform, the device management server compares the list of assigned devices to the list of devices serviced by the technician user. In the case that the validation was successful (i.e. the technician user has performed servicing only on devices that he or she is supposed to service) (step S1604, yes), the device management server moves on to the next step.

On the other hand, in the case that the validation was not successful (i.e. the technician user has performed servicing on devices that he or she is not supposed to service) (step S1604, no), the device management server determines a policy setting that was put in place (step S1605). Such policy setting may determine the action that the device management server may take when the validation process was not successful. In this case, the policy setting directs the device management server to reject the list of serviced output devices received from the host terminal (step S1606).

Figure 17:
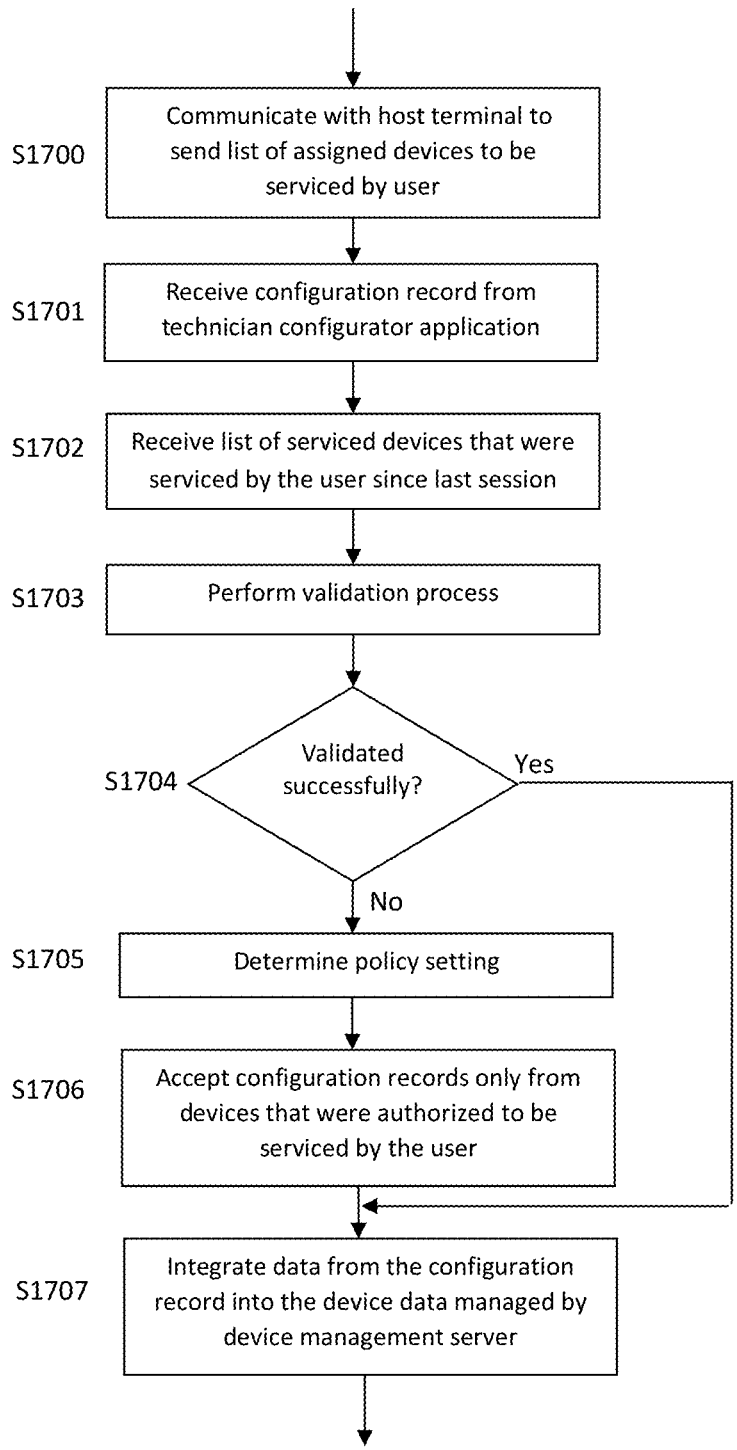
FIG. 17 shows a flow chart of a method that can be performed in any of the systems of FIGS. 1A-1C (or an equivalent)

FIG. 17 shows a method that can be performed by or with a device management server (e.g., 103).

When a device management server is connected to a host terminal (e.g., 101) that includes a technician configurator application (e.g., 101a), the device management server may send to the technician configurator application a list of assigned devices to be serviced by a technician user that is authenticated (step 1700). Next, the device management server may receive configuration records from the technician configurator application (step S1701). Further, the device management server may also receive a list of serviced devices that were serviced by the technician user since last session (step S1702). Such list includes one or more output devices that the technician user worked on since the last configuration session.

Next, the device management server performs a validation process (step S1703). The technician user may not have serviced only devices that he or she was assigned to. Instead, the technician user may have serviced other devices that he or she was not assigned to (or not authorized to service). To facilitate determining whether the technician user has serviced output devices that he or she was not authorized to perform, the device management server compares the list of assigned devices to the list of devices serviced by the technician user. In the case that the validation was successful (i.e. the technician user has performed servicing only on devices that he or she is supposed to service) (step S1704, yes), the device management server moves on to the next step.

On the other hand, in the case that the validation was not successful (i.e. the technician user has performed servicing on devices that he or she is not supposed to service) (step S1704, no), the device management server determines a policy setting that was put in place (step S1705). Such policy setting may determine the action that the device management server may take when the validation process was not successful. In this case, the policy setting directs the device management server to accept configuration records only from devices that were authorized to be serviced by the technician user (step S1706). Next, the device management server integrates data from the configuration record into device data managed by device management server (step S1707).

Figure 18:
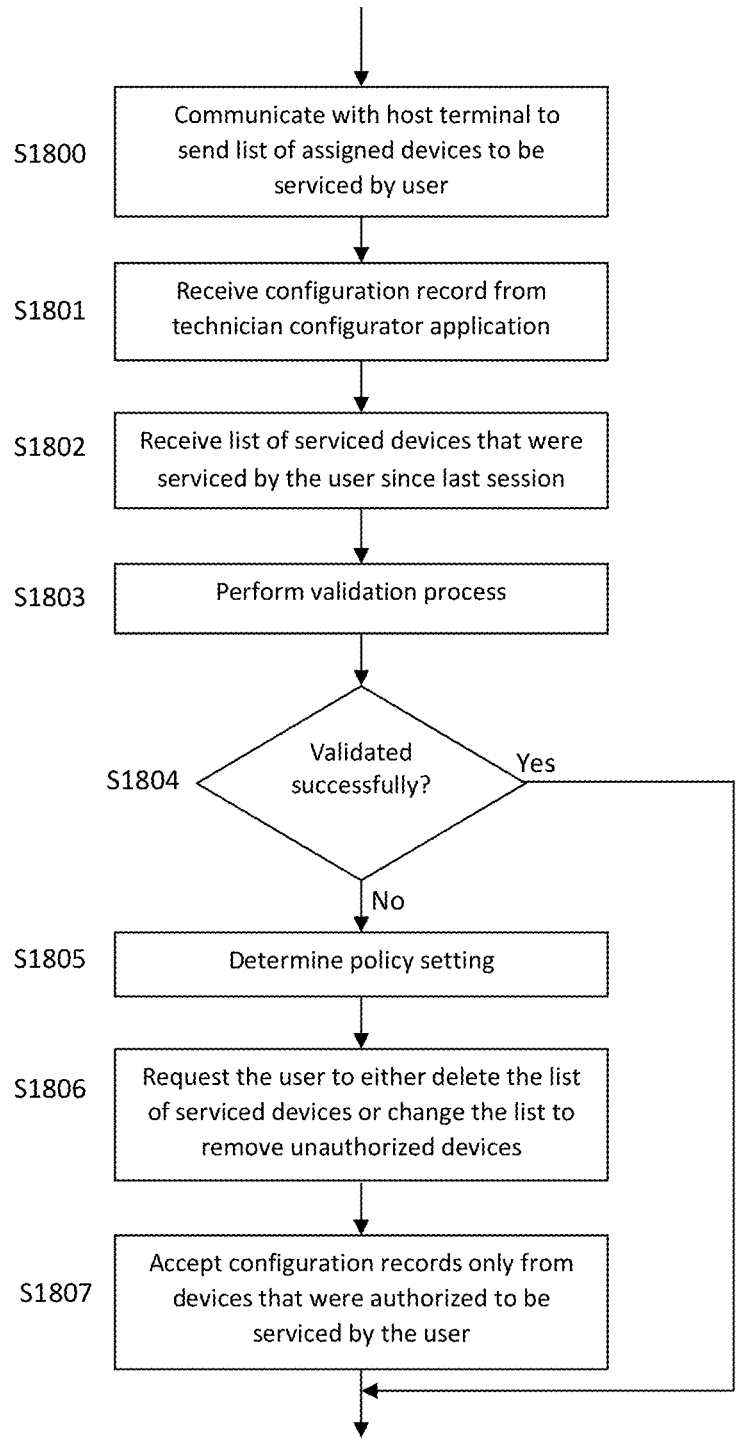
FIG. 18 shows a flow chart of a method that can be performed in any of the systems of FIGS. 1A-1C (or an equivalent)

FIG. 18 shows a method that can be performed by or with a device management server (e.g., 103).

When a device management server is connected to a host terminal (e.g., 101) that includes a technician configurator application (e.g., 101a), the device management server may send to the technician configurator application a list of assigned devices to be serviced by a technician user that is authenticated (step 1800). Next, the device management server may receive configuration records from the technician configurator application (step S1801). Further, the device management server may also receive a list of serviced devices that were serviced by the technician user since last session (step S1802). Such list includes one or more output devices that the technician user worked on since the last configuration session.

Next, the device management server performs a validation process (step S1803). The technician user may not have serviced only devices that he or she was assigned to. Instead, the technician user may have serviced other devices that he or she was not assigned to (or not authorized to service). To facilitate determining whether the technician user has serviced output devices that he or she was not authorized to perform, the device management server compares the list of assigned devices to the list of devices serviced by the technician user. In the case that the validation was successful (i.e. the technician user has performed servicing only on devices that he or she is supposed to service) (step S1804, yes), the device management server moves on to the next step.

On the other hand, in the case that the validation was not successful (i.e. the technician user has performed servicing on devices that he or she is not supposed to service) (step S1804, no), the device management server determines a policy setting that was put in place (step S1805). Such policy setting may determine the action that the device management server may take when the validation process was not successful. In this case, the policy setting directs the device management server to request the technician user to either delete the list of serviced devices or change the list to remove unauthorized devices (step S1806). Further policy setting also directs the device management server to accept configuration records only from devices that were authorized to be serviced by the technician user (step S1807).

FIG. 19A shows an example of configuration records (for technician users) that may be stored by a host terminal or send to a device management server. As shown, such configuration table includes one or more sessions associated with the technician user, a timestamp corresponding to the session and the number of devices serviced by that technician user during that session.

FIG. 19B shows an example of configuration records (for a single technician users) that may be stored by a host terminal or send to a device management server. As shown, such configuration records table is for a user named "SMoss" and includes (i) one or more sessions associated with the technician user, (ii) a timestamp corresponding to the session, (iii) the device configured by that technician user during that session, (iv) whether the configuration was successful (along with the configuration templates used), (v) the historical data of the device, (vi) the usage counter data of the device and the (vii) analytical data of the device.

The aforementioned specific embodiments and examples are illustrative, and many variations can be introduced on these embodiments and examples without departing from the spirit of the disclosure or from the scope of the appended claims. For example, various examples and embodiments are discussed herein with reference to output devices, but it should be appreciated that the inventive subject matter of this disclosure can be applied to maintain, configure and service devices other than output devices, such as automobile emission control systems, medical test equipment, flight systems in aircraft, etc. In such examples (as well as many others), it is highly desirable, and even necessary in many instances, to oversee the application of configuration settings and to log information regarding who made changes, what changes were made, when they were made, as well as what systems they were applied to.

In addition, elements and/or features of different examples and illustrative embodiments may be combined with each other and/or substituted for each other within the scope of this disclosure and appended claims. For example, the orders in which the steps are performed in the aforementioned methods are not limited to those shown in the examples of FIGS. 6, 8, 10, 12, 14 and 16-18, and may be switched as long as similar results are achieved. Also, the methods illustrated in the examples of FIGS. 6, 8, 10, 12, 14 and 16-18 may be implemented using any of the systems described in connection with FIGS. 1A-1C (or an equivalent).

What is claimed is:

1. A technician configurator application including one or more programs of instructions embodied in a non-transitory computer readable medium and executable by a processor of a host terminal to configure the host terminal to perform a method comprising:

(a) determining, based on user credentials of a technician user of the host terminal, one or more output devices to be serviced by the technician user, by communicating via a network interface of the host terminal with a device management server that manages plural output device, and providing, via an application user interface displayed on the host terminal, a list of said output devices to be serviced by the technician user;

(b) obtaining, by network communication through the network interface of the host terminal with the device management server that manages plural output devices including said one or more output devices to be serviced by the technician user, configuration templates corresponding to said one or more output devices, respectively;

(c) obtaining, by point-to-point communication with an output device, amongst the one or more output devices to be serviced by the technician user, a device identifier of the output device;

(d) retrieving, by said point-to-point communication with the output device, configuration information corresponding to current configuration of the output device, displaying on the host terminal the retrieved configuration information of the output device, and retrieving a configuration template, amongst the obtained configuration templates, corresponding to the output device indicated by the device identifier obtained by said point-to-point communication, and upon confirmation by the technician user of the technician configurator application, applying configuration settings from the retrieved configuration template corresponding to the output device indicated by the device identifier, to the output device, wherein upon the technician configurator application connecting with the output device, the technician configurator application retrieves current configuration settings of the output device from the output device, and validates the retrieved current configuration settings of the output device against configuration templates configured for the output device, and the technician configurator application stores locally on the host terminal a validation record including (I) a timestamp associated with the validation, (II) validation results and (III) the configuration templates employed in the validation, and wherein upon the technician configurator application connecting with the device management server, the technician configurator application uploads to the device management server the validation record stored locally on the host terminal.

2. The technician configurator application as claimed in claim 1, wherein the application user interface includes an authentication user interface portion to require the technician user of the host terminal to enter the user credentials via the authentication user interface portion, to commence a preparation session, wherein the download of the configuration templates by the technician configurator application in the preparation session from the device management server does not commence until the technician user has been authenticated based on the user credentials entered via the authentication user interface portion.

3. The technician configurator application as claimed in claim 1, wherein the application user interface includes an authentication user interface portion to require the technician user of the host terminal to enter the user credentials via the authentication user interface portion, to commence a preparation session, wherein upon authentication of the technician user based on the user credentials entered via the authentication user interface, the technician configurator application communicates with the device management server to determine said one or more output devices to be serviced by the technician user authenticated based on the user credentials entered via the authentication user interface portion.

4. The technician configurator application as claimed in claim 3, wherein for each specified output device to be serviced by the user authenticated based on the user credentials entered via the authentication user interface portion, the technician configurator application receives from the device management server one or more configuration templates for the specified output device and security credentials for accessing the specified output device via the point-to-point communication with the specified output device.

5. The technician configurator application as claimed in claim 4, wherein when the device management server indicates that the technician user is to be permitted to select a configuration template for said one or more of the output devices, the technician configurator application receives from the device management server additional configuration templates to be made available for selection by the technician user.

6. The technician configurator application as claimed in claim 3, wherein upon authentication of the user based on the user credentials entered via the authentication user interface, the technician configurator application additionally receives from the device management server indication of an operating mode, and wherein the operating mode is one of (i) automatic mode in which the configuration settings in the configuration template received from the device management server are applied in an order specified, upon confirmation by the user and without the application user interface permitting the user to edit the configuration settings, (ii) guided mode in which the application user interface permits the user to specify one or more groups of settings to skip, and (iii) free mode in which the application user interface permits the user to select or unselect each setting in the configuration template and rearrange an order of the settings.

7. The technician configurator application as claimed in claim 6, wherein upon connection of the technician configurator application to a connected output device, the device identifier of the connected output device is obtained from the connected output device and the device identifier of the connected output device is compared to the list of said output devices to be serviced by the technician user, and wherein if the device identifier of the connected output device does not match any of the output devices on the list, the technician configurator application permits the technician user to proceed only if the operating mode is the free mode in which the technician user is permitted to select a configuration template from configuration templates stored locally on the host terminal.

8. The technician configurator application as claimed in claim 6, wherein when the operating mode is the free mode, the application user interface proposes (i) a set of templates to the technician user, from amongst associated configuration templates that are associated with the output device, and (ii) an order in which the templates in the set are proposed to be applied, and the application user interface permits the technician user to add other templates, remove specified templates from the set and modify the order in which the templates are to be applied to the output device, and wherein as the technician configurator application applies the templates to the output device in a configuration session, the technician configurator application maintains locally on the host terminal a configuration record of the configuration session including for each template applied, (i) a timestamp associated with when the template was applied, and (ii) configuration results including any failures during the configuration process, and wherein upon the technician configurator application connecting with the device management server, the technician configurator application uploads to the device management server the configuration record stored locally on the host terminal.

9. The technician configurator application as claimed in claim 1, wherein upon the technician configurator application applying in a configuration session to the output device the configuration settings from the retrieved configuration template corresponding to the output device, the technician configurator application stores locally on the host terminal a configuration record of the configuration session including (i) a timestamp associated with the configuration session, and (ii) configuration results including any failures during the configuration process, and wherein the technician configurator application provides the application user interface including an authentication user interface portion to require the technician user of the host terminal to enter user credentials via the authentication user interface portion, to commence a preparation session, and upon authentication of the technician user based on the user credentials entered via the authentication user interface and the technician configurator application connecting with the device management server in the preparation session, the technician configurator application uploads to the device management server the configuration record stored locally on the host terminal, and then the technician configurator application communicates with the device management server in the preparation session to determine a list of assigned devices to be serviced by the authenticated technician user.

10. The device management system as claimed in claim 9, wherein
upon authentication of the user and the technician configurator application connecting to the device management server to commence the current preparation session, the technician configurator application additionally uploads to the device management server a list of serviced devices that were serviced by the authenticated user since a last preparation session, and
the device management server performs a validation process to compare the list of serviced devices to the list of assigned devices that were assigned in the last preparation session to be serviced by the user, and determine unauthorized devices that were serviced by the user since the last preparation session and were not assigned to be serviced by the user, and wherein
in a case that the device management server determines that there are unauthorized devices that were serviced by the user since the last preparation session and were not assigned to be serviced by the user, the device management server performs, based on policy settings, one of (i) rejects the list of serviced output devices in its entirety, (ii) accepts only configuration records of devices on a validated list constituted by only serviced devices that were authorized to be serviced by the user, and (iii) communicates with the technician configurator application to prompt the user via the application user interface to either cancel the list of serviced devices or edit the list to remove unauthorized devices from the list and then accepts from the technician configurator application only configuration records of devices on the validated list constituted by only serviced devices that were authorized to be serviced by the user.

11. The device management system as claimed in claim 10, wherein
the configuration records accepted by the device management server from the technician configurator application include, for each authorized device on the validated list, status information downloaded by the technician configurator application from the authorized device indicating operating status of the authorized device, historical data corresponding to history log downloaded by the technician configurator application, and usage counter data and analytical data downloaded by the technician configurator application from the authorized device, and wherein
the device management server integrates the data from the configuration record corresponding to the authorized device, into the device data maintained by the device management server for the authorized device.

12. The technician configurator application as claimed in claim 1, wherein the method performed by the technician configurator application further comprises:
performing a configuration process by the technician configurator application in a configuration session commenced upon the technician configurator application connecting with the output device, the configuration process including, in addition to applying the configuration settings from the retrieved configuration template to the output device,
(i) maintaining by the technician configurator application locally on the host terminal, as the technician configurator application applies the configuration settings to the output device, a configuration record including (i) a timestamp associated with the configuration settings applied or being applied, and (ii) configuration results including any failures during the configuration process
(ii) collecting by the technician configurator application from the output device, data including status information indicating operating status of the authorized device, historical data corresponding to history log of the output device, and usage counter data and analytical data of the output device; and
(iii) requesting by the technician configurator application, upon the technician configurator application connecting with the device management server, validation by the device management server of, and transmitting upon the validation to the device management server, the configuration record maintained in (i) and the data collected in (ii) from the output device.

13. A device management system configured to manage plural output devices that provide printing or scanning services, the system comprising:
a device management server that maintains a device database of device data for managed devices and maintains configuration templates; and
one or more host terminals, each host terminal hosting a technician configurator application including one or more programs of instructions embodied in a non-transitory computer readable medium and executable by a processor of the host terminal to configure the host terminal to perform a method comprising:
(a) determining, based on user credentials of a technician user of the host terminal, one or more output devices to be serviced by the technician user, by communicating via a network interface of the host terminal with a device management server that manages plural output device, and providing, via an application user interface displayed on the host terminal, a list of said output devices to be serviced by the technician user;
(b) obtaining, by network communication through the network interface of the host terminal with the device management server that manages the plural output devices including said one or more output devices to be serviced by the technician user, configuration templates corresponding to said one or more output devices, respectively;
(c) obtaining, by point-to-point communication with an output device, amongst the one or more output devices to be serviced by the technician user, a device identifier of the output device;
(d) retrieving, by said point-to-point communication with the output device, configuration, information corresponding to current configuration of the output device, displaying on the host terminal the retrieved configuration information of the output device, and retrieving a configuration template, amongst the obtained configuration templates, corresponding to the output device indicated by the device identifier obtained by said point-to-point communication, and upon confirmation by the technician user of the technician configurator application, applying configuration settings from the retrieved configuration template corresponding to the output device indicated by the device identifier, to the output device,
wherein
upon the technician configurator application applying in a configuration session to the output device the configuration settings from the retrieved configuration template corresponding to the output device, the technician configurator application stores locally on the host terminal a configuration record of the configuration session including (I) a timestamp associated with the configuration session, and (II) configuration results including any failures during the configuration process, and wherein the technician configurator application provides the application user interface including an authentication user interface portion to require the technician user of the host terminal to enter user credentials via the authentication user interface portion, to commence a preparation session, and upon authentication of the technician user based on the user credentials entered via the authentication user interface and the technician configurator application connecting with the device management server in the preparation session, the technician configurator application uploads to the device management server the configuration record stored locally on the host terminal, and then the technician configurator application communicates with the device management server in the preparation session to determine a list of assigned devices to be serviced by the authenticated technician user.

14. The device management system as claimed in claim 13, wherein the technician configurator application provides the application user interface on the host terminal, and upon the technician configurator application connecting with the output device, the technician configurator application retrieves current operating status of the output device from the output device, and displays the current operating status of the output device via the application user interface on the host terminal, and wherein in a case that the current operating status of the output device requires repair action, the technician configurator application records (i) a snapshot of current settings prior to the repair action, (ii) an operating status of the output device after the repair action is performed and (iii) the repair action, in association with the operating status before the repair action, in a device record stored locally on the host terminal, and wherein upon the technician configurator application connecting with the device management server, the technician configurator application uploads the device record from the host terminal to the device management server.

15. The device management system as claimed in claim 13, wherein upon the technician configurator application connecting with the output device, the technician configurator application retrieves a history log of the output device from the output device, and stores the retrieved history log of the output device locally on the host terminal, and wherein upon the technician configurator application connecting with the device management server, the technician configurator application uploads the history log of the output device from the host terminal to the device management server.

16. The device management system as claimed in claim 13, wherein upon the technician configurator application connecting with the output device, the technician configurator application retrieves usage counter data and analytical data of the output device from the output device, and stores the retrieved data of the output device locally on the host terminal, and wherein upon the technician configurator application connecting with the device management server, the technician configurator application uploads to the device management server the retrieved data of the output device stored locally on the host terminal.

17. The device management system as claimed in claim 13, wherein upon the technician configurator application connecting with the output device, the technician configurator application retrieves current configuration settings of the output device from the output device, and validates the retrieved current configuration settings of the output device against configuration templates configured for the output device, and the technician configurator application stores locally on the host terminal a validation record including (i) a timestamp associated with the validation, (ii) validation results and (iii) the configuration templates employed in the validation, and wherein upon the technician configurator application connecting with the device management server, the technician configurator application uploads to the device management server the validation record stored locally on the host terminal.

18. A method performed by a device management system including a device management server configured to maintain a device database of device data for plural output devices that provide printing or scanning services and maintain configuration templates, and the system additionally including a host terminal hosting a technician configurator application, the method comprising:

(a) determining, based on user credentials of a technician user of the host terminal, one or more output devices to be serviced by the technician user, by communicating via a network interface of the host terminal with a device management server that manages plural output device, and providing, via an application user interface displayed on the host terminal, a list of said output devices to be serviced by the technician user;

(b) obtaining, by network communication through the network interface of the host terminal with the device management server that manages plural output devices including said one or more output devices to be serviced by the technician user, configuration templates corresponding to said one or more output devices, respectively;

(c) obtaining by the technician configurator application by point-to-point communication with an output device, amongst the one or more output devices to be serviced by the technician user, a device identifier of the output device;

(d) retrieving by said point-to-point communication by the technician configurator application from the output device, configuration information corresponding to current configuration of the output device;

(e) displaying on the host terminal the retrieved configuration information of the output device;

(f) retrieving by the technician configurator application a configuration template, amongst the obtained configuration templates, corresponding to the output device indicated by the device identifier obtained by said point-to-point communication, and upon confirmation by the technician user of the technician configurator application, applying configuration settings from the retrieved configuration template, to the output device; and (g) performing a configuration process by the technician configurator application in a configuration session commenced upon the technician configurator application connecting with the output device, the configuration process including, in addition to applying the configuration settings from the retrieved configuration template to the output device, (g1) maintaining by the technician configurator application locally on the host terminal, as the technician configurator application applies the configuration settings to the output device, a configuration record including (i) a timestamp associated with the configuration settings applied or being applied, and (ii) configuration results including any failures during the configuration process (g2) collecting by the technician configurator application from the output device, data including status information indicating operating status of the authorized device, historical data corresponding to history log of the output device, and usage counter data and analytical data of the output device; and (g3) requesting by the technician configurator application, upon the technician configurator application connecting with the device management server, validation by the device management server of, and transmitting upon the validation to the device management server, the configuration record maintained in (g1) and the data collected in (g2) from the output device.

* * * * *